(12) United States Patent
Takeda et al.

(10) Patent No.: US 11,178,679 B2
(45) Date of Patent: Nov. 16, 2021

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Liu Liu, Beijing (CN); Huiling Jiang, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 176 days.

(21) Appl. No.: 16/473,767

(22) PCT Filed: Dec. 26, 2017

(86) PCT No.: PCT/JP2017/046560
§ 371 (c)(1),
(2) Date: Jun. 26, 2019

(87) PCT Pub. No.: WO2018/124029
PCT Pub. Date: May 7, 2018

(65) Prior Publication Data
US 2021/0136794 A1    May 6, 2021

(30) Foreign Application Priority Data
Dec. 27, 2016    (JP) .............................. JP2016-254325

(51) Int. Cl.
*H04W 4/00*    (2018.01)
*H04W 72/12*    (2009.01)

(52) U.S. Cl.
CPC ... *H04W 72/1268* (2013.01); *H04W 72/1257* (2013.01); *H04W 72/1284* (2013.01)

(58) Field of Classification Search
None
See application file for complete search history.

(56) References Cited

U.S. PATENT DOCUMENTS

| | | | |
|---|---|---|---|
| 2012/0140728 A1* | 6/2012 | Nakao | H04L 5/0023 370/329 |
| 2013/0163537 A1* | 6/2013 | Anderson | H04L 1/1671 370/329 |

(Continued)

FOREIGN PATENT DOCUMENTS

| | | |
|---|---|---|
| WO | 2016060754 A1 | 4/2016 |
| WO | 2016157809 A1 | 10/2016 |

OTHER PUBLICATIONS

International Search Report issued for PCT/JP2017/046560, dated Mar. 20, 2018 (5 pages).

(Continued)

*Primary Examiner* — Phirin Sam
(74) *Attorney, Agent, or Firm* — Osha Bergman Watanabe & Burton

(57) ABSTRACT

The present invention is designed so that, even when communication is made using a plurality of transmission time intervals (TTIs), scheduling requests are transmitted adequately. According to one aspect of the present invention, a user terminal has a transmitting/receiving section that transmits and/or receives using a plurality of transmission time intervals (TTIs) of different durations, and a control section that determines a resource to use to transmit a scheduling request (SR) based on at least one of a first TTI and a second TTI having a shorter TTI duration than the first TTI.

7 Claims, 18 Drawing Sheets

(56) References Cited

U.S. PATENT DOCUMENTS

| | | | |
|---|---|---|---|
| 2015/0055584 A1* | 2/2015 | Lee | H04W 72/0413 |
| | | | 370/329 |
| 2016/0105905 A1 | 4/2016 | Vajapeyam et al. | |
| 2016/0192386 A1* | 6/2016 | Kim | H04L 5/0055 |
| | | | 370/329 |
| 2016/0270110 A1 | 9/2016 | Dinan | |
| 2017/0295590 A1* | 10/2017 | Loehr | H04W 72/1242 |
| 2017/0310433 A1* | 10/2017 | Dinan | H04L 5/0098 |
| 2018/0077749 A1* | 3/2018 | Yamada | H04L 5/0053 |
| 2019/0124677 A1* | 4/2019 | Kim | H04W 72/1205 |
| 2019/0124718 A1* | 4/2019 | Yamada | H04W 72/1284 |
| 2020/0077453 A1* | 3/2020 | Babaei | H04W 74/002 |
| 2020/0221536 A1* | 7/2020 | Yamada | H04W 76/38 |
| 2020/0281000 A1* | 9/2020 | Loehr | H04W 72/1242 |
| 2020/0288436 A1* | 9/2020 | Byun | H04L 5/0091 |

OTHER PUBLICATIONS

Written Opinion issued for PCT/JP2017/046560, dated Mar. 20, 2018 (4 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
CATT; "MAC Impact of Short TTI"; 3GPP TSG-RAN WG2 Meeting #96 R2-167965; Reno, USA, Nov. 14-18, 2016 (4 pages).
Extended European Search Report issued in counterpart European Patent Application No. 17889377.2, dated Jul. 13, 2020 (10 pages).
CATT; "UCI transmission for sTTI"; 3GPP TSG RAN WG1 Meeting #87 R1-1611356; Reno, USA, Nov. 14-18, 2016 (4 pages).
Panasonic; "UL simultaneous transmission betwen sTTI and TTI"; 3GPP TSG RAN WG1 Meeting #86bis R1-1609574; Lisbon, Portugal, Oct. 10-14, 2016 (2 pages).
LG Electronics; "Details on SR, SRS, and SPS transmission for MTC UE"; 3GPP TSG RAN WG1 Meeting #83 R1-156848; Anaheim, USA, Nov. 15-22, 2015 (6 pages).
Office Action issued in the counterpart European Patent Application No. 17889377.2, dated Feb. 22, 2021 (8 pages).
Ericsson, ST-Ericsson, Nokia Siemens Networks, Nokia Corporation; "SR prohibit timer"; 3GPP TSG-RAN2 Meeting #68, R2-097263; Jeju, South Korea, Nov. 9-13, 2009 (2 pages).

* cited by examiner

| SR configuration Index $I_{SR}$ | SR periodicity (ms) $SR_{PERIODICITY}$ | SR subframe offset $N_{OFFSET,SR}$ |
|---|---|---|
| 0 – 4 | 5 | $I_{SR}$ |
| 5 – 14 | 10 | $I_{SR} - 5$ |
| 15 – 34 | 20 | $I_{SR} - 15$ |
| 35 – 74 | 40 | $I_{SR} - 35$ |
| 75 – 154 | 80 | $I_{SR} - 75$ |
| 155 – 156 | 2 | $I_{SR} - 155$ |
| 157 | 1 | $I_{SR} - 157$ |

FIG. 1

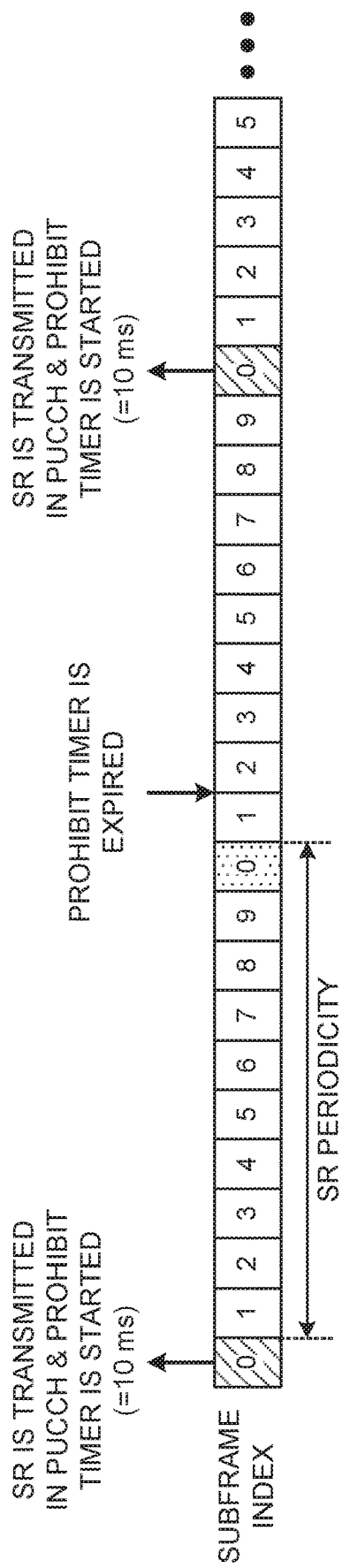
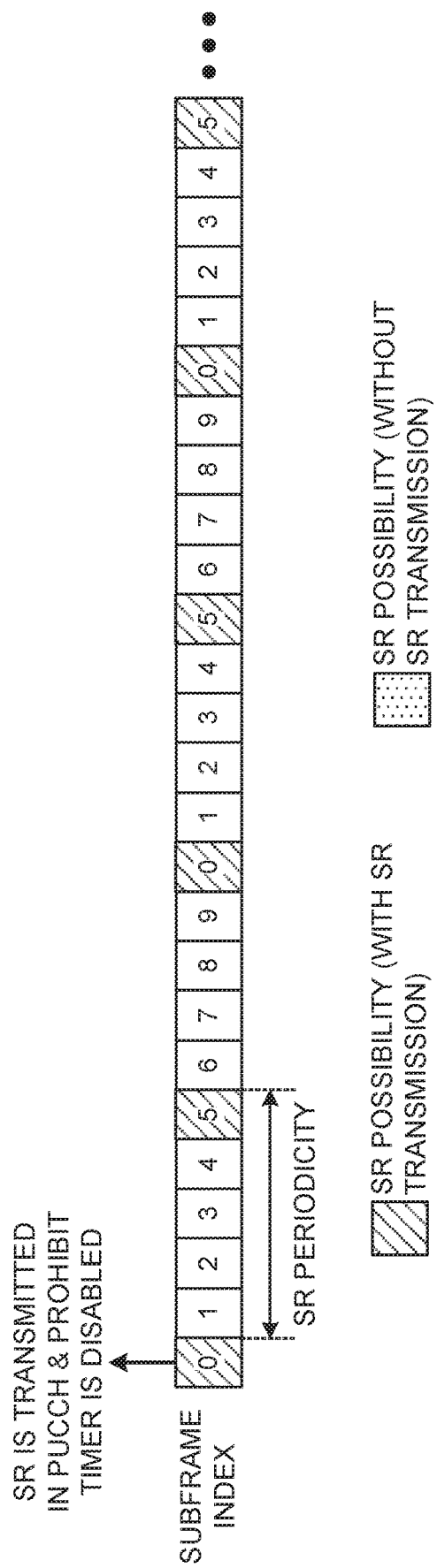

| SR configuration Index $I_{SR\_sTTI}$ | SR periodicity (sTTI length) $SR\_sTTI_{PERIODICITY}$ | SR sTTI offset $N_{OFFSET,SR\_sTTI}$ |
|---|---|---|
| 0 – 4 | 5 | $I_{SR\ sTTI}$ |
| 5 – 14 | 10 | $I_{SR\ sTTI}$ - 5 |
| 15 – 34 | 20 | $I_{SR\ sTTI}$ - 15 |
| 35 – 74 | 40 | $I_{SR\ sTTI}$ - 35 |
| 75 – 154 | 80 | $I_{SR\ sTTI}$ - 75 |
| 155 – 156 | 2 | $I_{SR\ sTTI}$ - 155 |
| 157 | 1 | $I_{SR\ sTTI}$ - 157 |

FIG. 4

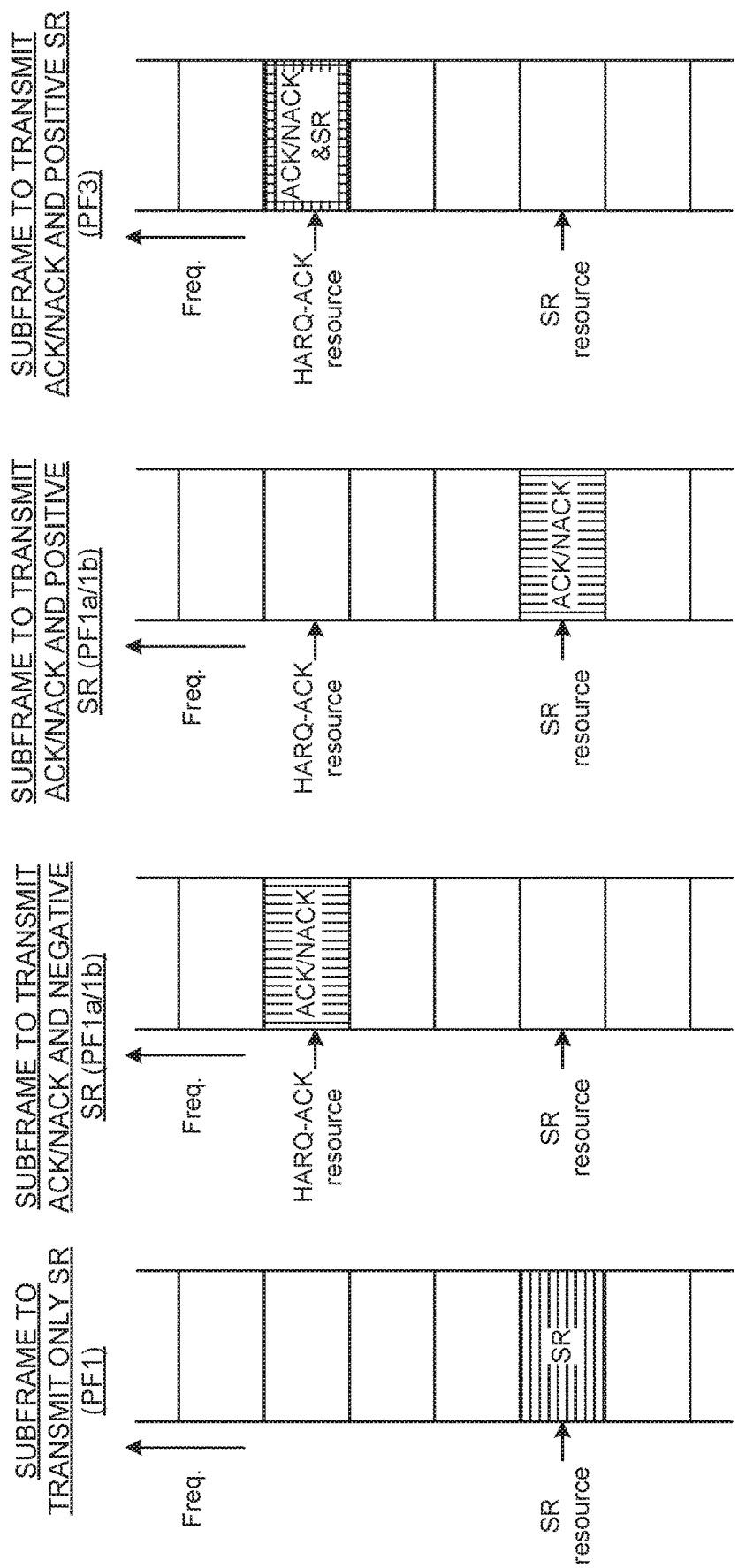

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-Advanced," "LTE Rel. 10," "LTE Rel. 11," "LTE Rel. 12." etc.) have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)." "5G+(plus)," "NR (New Radio)," "Nx (New radio access)," "FX (Future generation radio access)," "LTE Rel. 13." "LTE Rel. 14" or "LTE. Rel. 15" and so on) are under study.

Carrier aggregation (CA) to integrate multiple component carriers (CC) is introduced in LTE Rel. 10/11 in order to achieve broadbandization. Each CC is configured with the system band of LTE Rel. 8 as one unit. Furthermore, in CA, a plurality of CCs of the same base station (referred to as an "eNB (evolved Node B)," a "BS (Base Station)" and so on) are configured in a user terminal (UE: User Equipment).

Meanwhile, in LTE Rel. 12, dual connectivity (DC), in which multiple cell groups (CGs) are configured in a UE, is also introduced. Each cell group is comprised of at least one cell (CC). In DC, since multiple CCs of different base stations are integrated, DC is also referred to as "inter-base-station CA (Inter-eNB CA).

Also, in LTE Rel. 8 to 12, frequency division duplex (FDD), in which downlink (DL) transmission and uplink (UL) transmission are made in different frequency bands, and time division duplex (TDD), in which DL transmission and UL transmission are switched over time and made in the same frequency band, are introduced.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Future radio communication systems (for example 5G, NR, etc.) are expected to realize various radio communication services so as to fulfill mutually varying requirements (for example, ultra high speed, large capacity, ultra-low latency, etc.)

For example, NR is under study to provide radio communication services referred to as "eMBB (enhanced Mobile Broad Band)," "mMTC (massive Machine Type Communication)." "URLLC (Ultra Reliable and Low Latency Communications)," and so on.

Now, in existing LTE (for example LTE Rel. 9 to 13), a UE transmits a scheduling request (SR) to a base station to request uplink shared channel resources for data transmission. In existing LTE, SR-related control is designed in units of subframes, which have a transmission time interval (TTI) duration.

For the future of LTE (for example, LTE Rel.14, 15, etc.), for example, NR is under study to allow a UE to perform transmission and receipt using a plurality of TTI durations in one carrier. However. SR-related control that makes it possible to cope with cases where the TTI duration varies has not yet been provided. Failure to execute SR-related control in an adequate manner might lead to a drop in spectral efficiency, a drop in communication throughput and so on.

The present invention has been made in view of the above, and it is therefore an object of the present invention to provide a user terminal and a radio communication method, whereby scheduling requests can be transmitted adequately even when communication is made using a plurality of TTI durations.

Solution to Problem

According to one aspect of the present invention, a user terminal has a transmitting/receiving section that transmits and/or receives using a plurality of transmission time intervals (TTIs) of different durations, and a control section that determines a resource to use to transmit a scheduling request (SR) based on at least one of a first TTI and a second TTI having a shorter TTI duration than the first TTI.

Advantageous Effects of Invention

According to the present invention, scheduling requests can be transmitted adequately even when communication is made using a plurality of TTI durations.

BRIEF DESCRIPTION OF DRAWINGS

FIG. 1 is a diagram to show associations among the SR configuration index, the SR periodicity and the SR subframe offset, as defined in existing LTE;

FIGS. 3A and 3B are diagrams, each showing an example of SR transmission according to embodiment 1.1;

FIG. 4 is a diagram to show examples of associations among the SR configuration index, the SR periodicity and the sTTI offset, according to embodiment 1.2;

FIGS. 12A to 12D are diagrams to show examples of SR transmission resource in existing LTE;

DESCRIPTION OF EMBODIMENTS

Figure 2:
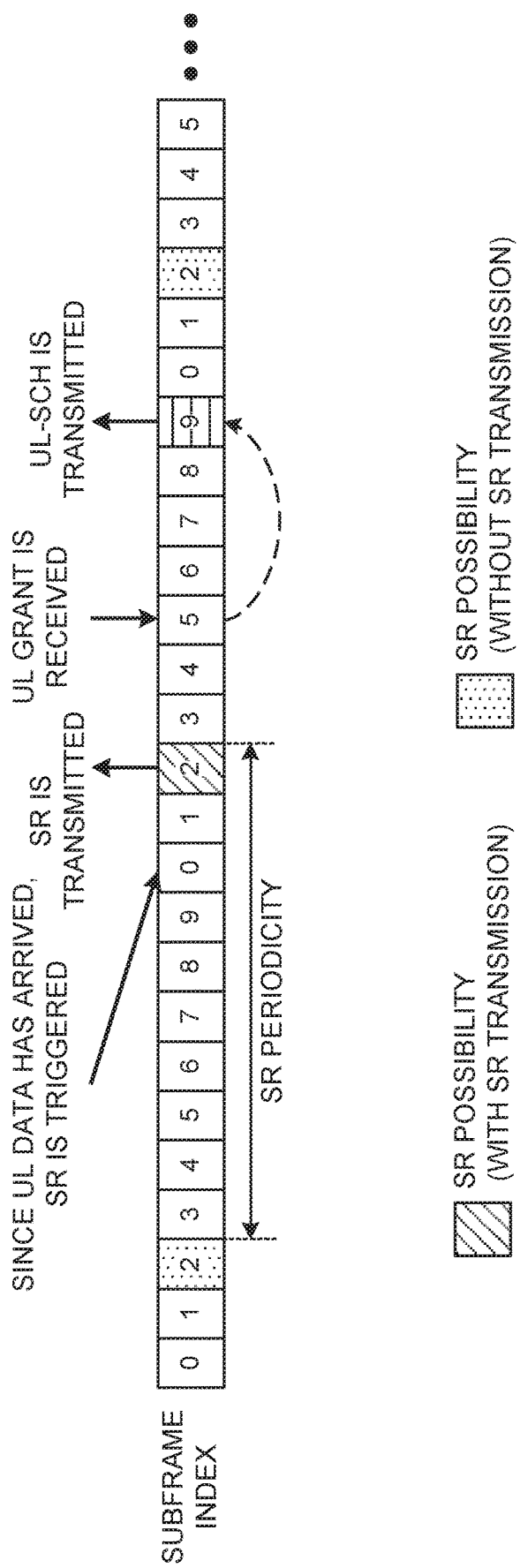
FIG. 2 is a diagram to show an example of control relating to SRs.

In LTE, to provide a method of reducing latency in communication, it may be possible to control the transmission and receipt of signals by introducing shortened TTIs (sTTIs) that have a shorter duration than existing transmission time intervals (TTIs) (subframes (1 ms)). Also, in 5G/NR, a study is in progress to allow a UE to use different services simultaneously. In this case, the duration of TTIs may be changed depending on services.

Note a "TTI" is the unit of time in transmitting and receiving the transport blocks, the code blocks and/or the codewords of transmitting/receiving data. Assuming that a TTI is provided, the period of time (for example, the number of symbols) where the transport blocks, the code blocks and/or the codewords of data are actually mapped may be shorter than the TTI.

For example, when a TTI is formed with a predetermined number of symbols (for example, fourteen symbols), the transport blocks, the code blocks and/or the codewords of transmitting/receiving data can be transmitted and received in one or a predetermined number of symbol periods among these. If the number of symbols in which the transport blocks, the code blocks and/or the codewords of transmitting/receiving data are transmitted/received is smaller than the number of symbols constituting the TTI, reference signals, control signals and so on can be mapped to the symbols in the TTI where no data is mapped.

Thus, even in either LTE or NR, a UE may transmit and/or receive both a long TTI and a short TTI in one carrier, in a predetermined period.

The long TTI refers to a TTI having a longer time duration than the short TTI (for example, a TTI having a time duration of 1 ms, as existing subframes do) (TTIs in LTE Rel.8 to 13), and may be referred to as a "normal TTI (nTTI)," a "normal subframe," a "long subframe." a "subframe," a "slot," a "long slot," etc.

The short TTI refers to a TTI having a shorter time duration than the long TTI, and may be referred to as a "shortened TTI," a "partial TTI (partial or fractional TTI)," a "shortened subframe," a "partial subframe." a "minislot," a "subslot" and so on.

The long TTI, for example, has a time duration of 1 ms, and is comprised of fourteen symbols (in the event a normal cyclic prefix (CP) is used) or comprised of twelve symbols (in the event an enhanced CP is used). The long TTI may be suitable for services that do not require strict latency reduction, such as eMBB and MTC.

In existing LTE, channels that are transmitted and/or received in TTIs (subframes) include a downlink control channel (PDCCH: Physical Downlink Control Channel), a downlink data channel (PDSCH: Physical Downlink Shared Channel), an uplink control channel (PUCCH: Physical Uplink Control Channel), a downlink data channel (PUSCH: Physical Uplink Shared Channel) and so on.

The short TTI is comprised of, for example, fewer symbols (for example, two symbols) than the long TTI, and the time duration of each symbol (symbol duration) may be the same as that of the long TTI (for example, 66.7 μs). Alternatively, the short TTI may be comprised of the same number of symbols as the long TTI, and the symbol duration of each symbol may be shorter than that of the long TTI.

When using the short TTI, the time margin for processing (for example, encoding, decoding, etc.) in UEs and/or base stations grows, so that the processing latency can be reduced. Also, when short TTIs are used, it is possible to increase the number of UEs that can be accommodated per unit time (for example, 1 ms). The short TTI may be suitable for services that require strict latency reduction, such as URLLC.

A UE in which the short TTI is configured would use channels of shorter time units than existing data and control channels. In LTE and NR, for example, as shortened channels to be transmitted and/or received in short TTIs a shortened downlink control channel (sPDCCH: shortened PDCCH), a shortened downlink data channel (sPDSCH: shortened PDSCH), a shortened uplink control channel (sPUCCH: shortened PUCCH), and a shortened downlink data channel (sPUSCH: shortened PUSCH) and so on are under research.

Note that, although examples will be shown in this specification where two short TTIs (for example, the short TTI duration=seven symbols long) are included in a long TTI (for example, the long TTI duration=1 ms), the format of each TTI is not limited to this. For example, the long TTI and/or the short TTI may have different time durations, and short TTIs of a plurality of short TTI durations may be used in one long TTI. Also, any number of short TTIs may be contained in one long TTI. In addition, the long TTI and the short TTI may be constituted by relatively prime numbers of symbols. For example, the long TTI may be fourteen symbols long, and the short TTI may be three symbols long. In this case, the long TTI duration is not formed even of the short TTI, having the same duration, is multiplied by an integer.

Now, in existing LTE (for example, LTE Rel. 9 to 13), a UE feeds back uplink control information (UCI) to a device (for example, a base station) on the network side. The base station performs data retransmission control, scheduling control and so on for the UE based on the received UCI.

UCI in existing systems includes channel state information (CSI: Channel State Information), which includes at least one of the channel quality indicator (CQI), the precoding matrix indicator (PMI), the precoding type indicator (PTI) and the rank indicator (RI), delivery acknowledgment information in response to downlink signals (for example, a downlink shared channel (PDSCH)), scheduling requests and so on. The delivery acknowledgment information may be referred to as "HARQ-ACK (Hybrid Automatic Repeat reQuest Acknowledgment)," "ACK/NACK (A/N)," "retransmission control information," and so on.

An SR is transmitted from the base station, in order to request uplink shared channel resource for data transmission. Parameters that relate to the SR are configured in the UE from the base station, via higher layer signaling (for example, RRC (Radio Resource Control) signaling). These SR-related parameters include, for example, the SR configuration index (also referred to as "configuration index," "sr-ConfigIndex," "$I_{SR}$" and so on).

The SR configuration index is associated with the periodicity of SR transmission (also referred to as "SR periodicity," "$SR_{PERIODICITY}$" and so on) and the SR subframe offset (also referred to as "SR offset," "$N_{OFFSET}$, SR" and so on), so that the UE judges which SR periodicity and SR subframe offset are to be used, based on the SR configuration index that is reported.

FIG. 1 is a diagram to show an example of how SR configuration indices, SR periodicities and SR subframe offsets are associated with each other, as defined in existing LTE. In association with the SR configuration indices, the SR periodicity is configured in the values of 1, 2, 5, 10, 20, 40 and 80 [ms]. Furthermore, in association with the SR configuration indices, the SR subframe offset is specified in a range of values from 0 to (SR periodicity−1).

An SR may be transmitted at an SR starting position where following equation 1 is fulfilled (also referred to as an "SR transmission instance," "SR possibility," "SR-transmittable subframe" and so on).

$$(10 \times n_f + \lfloor n_s/2 \rfloor - N_{OFFSET}) \bmod SR_{PERIODICITY} = 0 \quad \text{(Equation 1)}$$

Here, $n_f$ is the system frame number (SFN), and $n_s$ is the slot number in a radio frame.

However, even when a subframe fulfills equation 1, an SR cannot be transmitted before a prohibit timer expires. A parameter related to the prohibit timer (also referred to as "the expiration time of the prohibit timer," "sr-Prohibit-Timer-r9" and so on) is configured in the UE, by the base station, via higher layer signaling (for example, RRC signaling). This parameter shows how many times bigger the prohibit timer's expiration time is than the minimum SR periodicity among the cells where the PUCCH is configured.

An SR counter (SR_COUNTER) is managed under the MAC (Medium Access Control) entity in the UE, and shows the number of times the SR is transmitted. When the SR counter is equal to or greater than a predetermined threshold, the UE releases the PUCCH measurement reference signal (SRS: Sounding Reference Signal) in the serving cell or initializes the random access procedures.

FIG. 2 is a diagram to show an example of control related to SRs. FIG. 2 shows an example in which the configuration index is 7 (in other words, the SR subframes start from subframe #2, and the SR periodicity is 10 ms). In subframe #2, the UE has no UL data to transmit, and therefore does not transmit an SR.

After that, for example, when UL data for a logical channel (LC) belonging to a predetermined logical channel group (LCG) becomes available (arrives), an SR will be triggered (to be more accurate, a buffer status report (BSR) is triggered, but the description of this will be omitted).

When an SR is triggered, the UE can transmit the SR at an SR possibility. When the base station receives the SR from the UE, the base station transmits downlink control information (DCI) that schedules UL data transmission, to this UE. The DCI is also referred to as "UL grant." In existing LTE, when a UE receives a UL grant, the UE transmits UL data, after a predetermined period (four subframes), by using the uplink shared channel resource specified by the UL grant.

Although, in existing LTE (for example LTE Rel. 9 to 13), the TTI duration has been fixed at 1 ms (subframe), in future LTE (for example LTE Rel. 14 and 15) and NR, the TTI duration may vary, as mentioned earlier. SR-related control that can cope with such cases has not yet been provided. Failure to execute SR-related control in an adequate manner might lead to a drop in spectral efficiency, a drop in communication throughput and so on.

Thus, the present inventors have found out a control method for adequately transmitting and/or receiving SRs even when communication is made using a plurality of TTI durations.

Now, embodiments of the present invention will be described in detail below with reference to the accompanying drawings. Note that the radio communication methods according to the herein-contained embodiments may be used individually or may be used in combination.

(Radio communication method)

First Embodiment

According to the first embodiment of the present invention, a base station applies one of the following configurations to a UE:
(1) The base station configures SRs only in the PUCCH used in long TTIs (embodiment 1.1);
(2) The base station configure SRs only in the sPUCCH used in short TTIs (embodiment 1.2); and
(3) The base station configures SRs in both the PUCCH used in long TTIs and the sPUCCH used in short TTIs (embodiment 1.3). Now, each embodiment will be described below.

Embodiment 1.1

In embodiment 1.1, an SR is configured in the PUCCH, and an SR is not configured in the sPUCCH. In embodiment 1.1, after the short TTI is set for operation (short TTI operation), a base station may reconfigure the parameters related to SRs (for example, the SR periodicity, the expiration time of the prohibit timer, and so on) in a UE so as to make the transmission delay of the SR shorter.

FIGS. 3A and 3B are diagrams, each showing an example of SR transmission in accordance with embodiment 1.1. FIG. 3A is a diagram to show an example of the SR transmission before the short TTI operation is configured. FIG. 3A shows an example, in which the configuration index is 5 (in other words, the SR subframes start from subframe #0, and the SR periodicity is 10 ms, and in which the expiration time of the prohibit timer is 10 ms. Assume that, in the UE, an SR is already triggered at the time of first subframe #0.

In this case, the UE transmits an SR in first subframe #0 using the PUCCH, and starts the prohibit timer. Although second subframe #0 is a subframe in which an SR can be transmitted, since the prohibit timer has not expired yet, the UE does not transmit an SR in this subframe. In third subframe #0, the prohibit timer is already expired, so that the UE transmits an SR in the PUCCH, and starts the prohibit timer.

FIG. 3B is a diagram to show an example of the SR transmission after the short TTI operation is configured. FIG. 3B shows an example, in which both the SR periodicity and the prohibit timer are reconfigured shorter than in the example of FIG. 3A, the configuration index is 0 (that is, the SR subframes start from subframe #0, and the SR periodicity is 5 ms), the prohibit timer's expiration time is 0 ms (disabled).

In this case, the UE transmits an SR using the PUCCH in first subframe #0, and, following this, transmits an SR, using the PUCCH, every 5 ms (in subframes #0 and #5).

Note that the associations between SR configuration indices and SR periodicities/SR offsets may be configured in the UE by higher layer signaling (for example, RRC signaling).

As described above, according to embodiment 1.1, SRs are configured only in the PUCCH, so that it is possible to transmit SRs in a short time even when short TTIs are configured, while still ensuring the coverage of SRs. In this case, by reconfiguring both the SR periodicity and the prohibit timer short, it is possible to control SRs in a way that is suitable for short TTIs.

Embodiment 1.2

In embodiment 1.2, an SR is configured in the sPUCCH, and an SR is not configured in the PUCCH. In embodiment 1.2, as for the granularity (fineness) of SR configurations for short TTIs (SR-related parameters (for example, the SR periodicity, the expiration time of the prohibit timer and so on)), it is possible to use units that having the durations of sTTIs, which are shorter than subframes, or use units having the length of long TTIs (for example, subframes). SR-related parameters that are transmitted in the sPUCCH include, for example, the SR configuration index for sTTIs (also referred to as "sr_sTTI-ConfigIndex," "$I_{SR\_sTTI}$" and so on)".

An SR configuration index for sTTIs is associated with an SR transmission periodicity for sTTIs (also referred to as "$SR\_sTTI_{PERIODICITY}$") and an SR sTTI offset (also referred to as "$N_{OFFSET,\ SR\_sTTI}$"), so that the UE can determine which SR periodicity and sTTI index to use, based on the SR configuration index that is reported.

FIG. 4 is a diagram to show examples of associations between SR configuration indices, and SR periodicities/sTTI offsets, according to embodiment 1.2. FIG. 4 is different from FIG. 1 in that the SR periodicity and the offset provide in sTTI-duration units.

Now, the UE may use a normal SR configuration index (sr-ConfigIndex) as an SR configuration index for sTTIs, or an SR configuration index for sTTIs may be configured by using a different parameter from that of a normal SR configuration index (sr-ConfigIndex). Furthermore, the associations between SR configuration indices for sTTIs and SR periodicities for sTTIs/SR and sTTI offsets may be configured in the UE by higher layer signaling (for example, RRC signaling).

For example, if the sTTI duration is seven OFDM symbols, an SR may be transmitted in an SR starting position (also referred to as an "SR transmission instance," an "SR possibility," an "SR-transmitting sTTI" and so on) where following equation 2 is fulfilled. Noted that, although a case will be described below in this specification where the sTTI duration is seven OFDM symbols, the sTTI duration that is applicable to the present invention is not limited to this.

$$\left(10 \times \frac{nTTI \text{ duration}}{sTTI \text{ duration}} \times n_f + i - N_{OFFSET,\ SR\_sTTI}\right) \quad \text{(Equation 2)}$$

$$\mod SR\_sTTI_{PERIODICITY} = 0$$

Here, i is the sTTI index in the radio frame. Note that the SR starting position may be determined without using equation 2. For example, if at least one of the SR periodicity, the offset and so on is configured in TTI-duration units, equation 1 may be used to find the SR starting position. In this case, while it is possible to configure SRs in sTTI units, the number of sTTIs being configuration candidates decreases, so that the overhead of higher layer signaling can be reduced.

Figure 5:
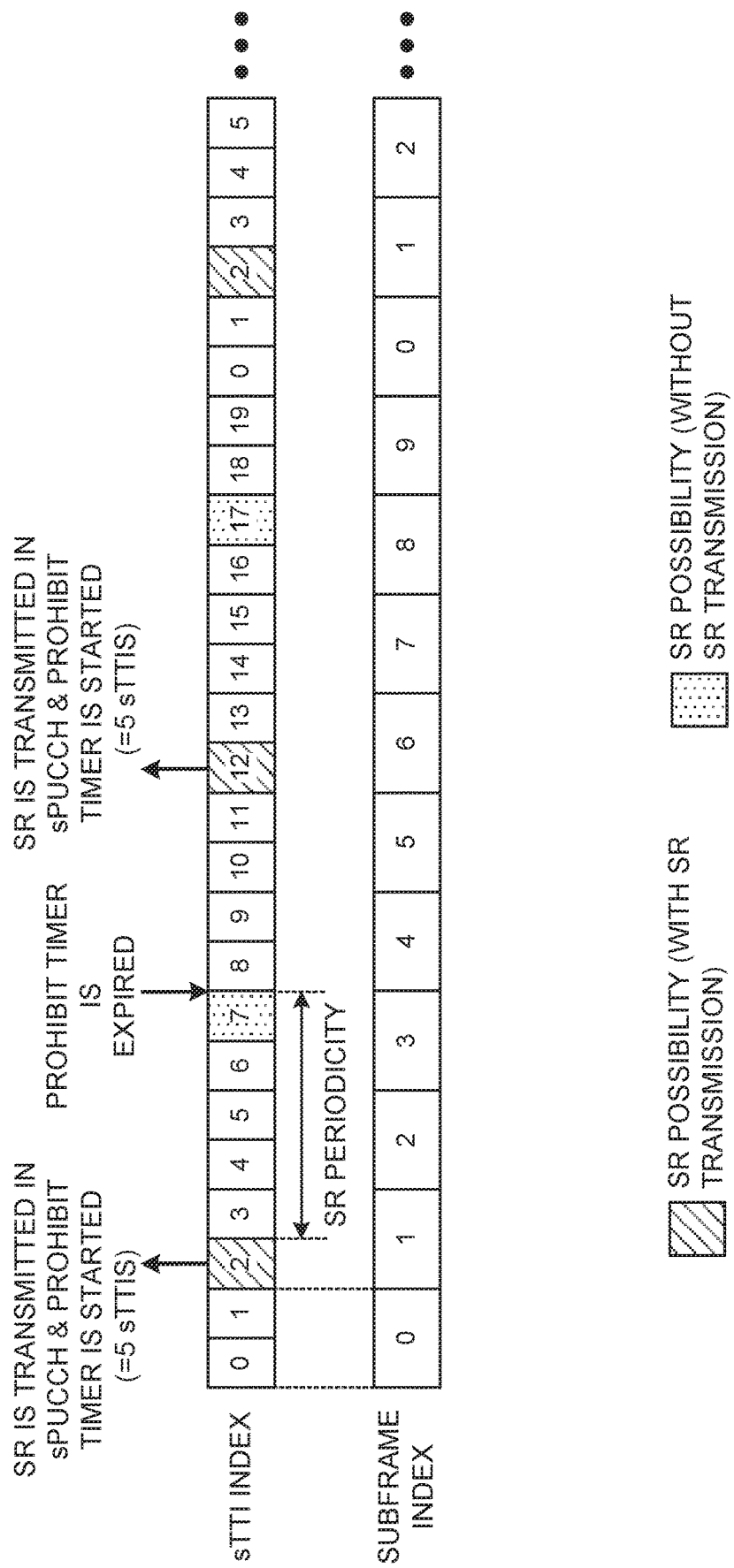
FIG. 5 is a diagram to show an example of SR transmission according to embodiment 1.2.

FIG. 5 is a diagram to show an example of SR transmission according to embodiment 1.2. In FIG. 5, the short TTI operation is configured. FIG. 5 shows an example, in which the configuration index is 2 (that is, referring to FIG. 4, the SR starting position is sTTI #2, and the SR periodicity is five sTTIs), and the expiration time of the prohibit timer is five sTTIs. In the UE, an SR is already triggered at the time of sTTI #2.

In this case, the UE transmits an SR using the sPUCCH in sTTI #2, and starts the prohibit timer. Although sTTI #7 is an SR possibility, since the prohibit timer has not expired yet, the UE does not transmit an SR in this subframe. In sTTI #12, the prohibit timer is already expired, so that the UE transmits an SR using the sPUCCH, and starts the prohibit timer.

The sTTI duration to be applied to SR transmission may be reported by higher layer signaling (for example, RRC signaling, MAC signaling (for example, MAC control elements (MAC CEs)), by broadcast information (the MIB (Master Information Block). SIBs (System Information Blocks), etc.), by physical layer signaling (for example, DCI), or by combining these.

For example, an sTTI duration that is semi-statically configured by higher layer may be used in the following cases:

(1) When only an SR is transmitted;
(2) When, using an SR resource, a one-bit or two-bit HARQ-ACK in response to the sPDSCH is multiplexed and transmitted with an SR (as in LTE PUCCH format 1a/1b); and
(3) When periodic CSI (P-CSI) transmission is supported in sTTIs, and, using a P-CSI resource, P-CSI is multiplexed and transmitted with an SR (as in LTE PUCCH format 4/5).

Also, an sTTI duration that is dynamically reported in physical layer signaling may be used when, using an HARQ-ACK resource, an HARQ-ACK is multiplexed and transmitted with an SR (as in LTE PUCCH format 3). In this case, the sTTI duration in the sPUCCH in which an HARQ-ACK is transmitted in response to the sPDSCH may be dynamically changed based on, for example, the payload size, the coverage and so on.

As explained above, according to embodiment 1.2, SRs are configured only in the sPUCCH, so that it is possible to transmit SRs in a short time.

Embodiment 1.3

In embodiment 1.3, SRs are configured in both the PUCCH and the sPUCCH. Embodiment 1.3 can be roughly divided into three, depending how SR procedures are controlled (embodiments 1.3.1 to 1.3.3).

Embodiment 1.3

In embodiment 1.3.1, one SR procedure is shared between both the long TTI and the short TTI. Once SRs are configured in both the PUCCH and the sPUCCH, the UE transmits the SR using the one that becomes available first after the present point in time.

The SR periodicity and the offset may be configured separately for the long TTI and for the short TTI. For the long TTI, these parameters may be configured in subframe (or slot) units.

On the other hand, for the short TTI, these parameters may be configured in sTTI-duration units (or in minislot units, subslot units, etc.), or configured in units of subframes (or slots). In the latter case, SRs in sTTIs may be transmitted in a fixed sTTI position in the subframe (for example, in the first sTTI in the subframe). In this way, it is possible to help the base station and the UE have common understanding as to where in the subframe the SR is transmitted using the sPUCCH. In this case, while it is possible to configure SRs in sTTI units, the number of sTTIs being configuration candidates decreases, so that the overhead of higher layer signaling can be reduced.

One SR counter and one prohibit timer are applied to both the SR in long TTIs and the SR in short TTIs. The granularity of the prohibit timer's expiration time may be defined in subframe units or in sTTI units. In the event the granularity of the prohibit timer's expiration time is defined in sTTI units, if a long TTI overlaps the prohibit timer's expiration time (prohibited period) only partially, the SR in this long TTI may be judged to be in the prohibited period. In this case, it is possible to allow the base station and the UE to share, in a strict manner, a common perception regarding the prohibited period. Alternatively, in the event the granularity of the prohibit timer's expiration time is defined in sTTI units, if a long TTI overlaps the prohibit timer's expiration time (prohibited period) only partially, the SR in this long TTI may be judged to be outside the prohibited period (that is, not prohibited). In this case, it is not only possible to allow the base station and the UE to share, in a strict manner, a common perception regarding the prohibited period, but it is also possible to allow the UE to have more opportunities for transmitting SRs, and, consequently, achieve latency reduction.

If the PUCCH for long TTIs and the sPUCCH for short TTIs are present to overlap each other in the same subframe (if their timings overlap), the UE may transmit the SR using the PUCCH, transmit the SR using the sPUCCH or transmit the SR using either one which the UE chooses itself.

Information as to which of the PUCCH and sPUCCH with overlapping timings is used to transmit the SR may be reported from the base station to the UE, or from the UE to the base station, by using higher layer signaling (for example RRC signaling), by using physical layer signaling (for example, DCI. UCI, etc.) or by combining these.

Figure 6:
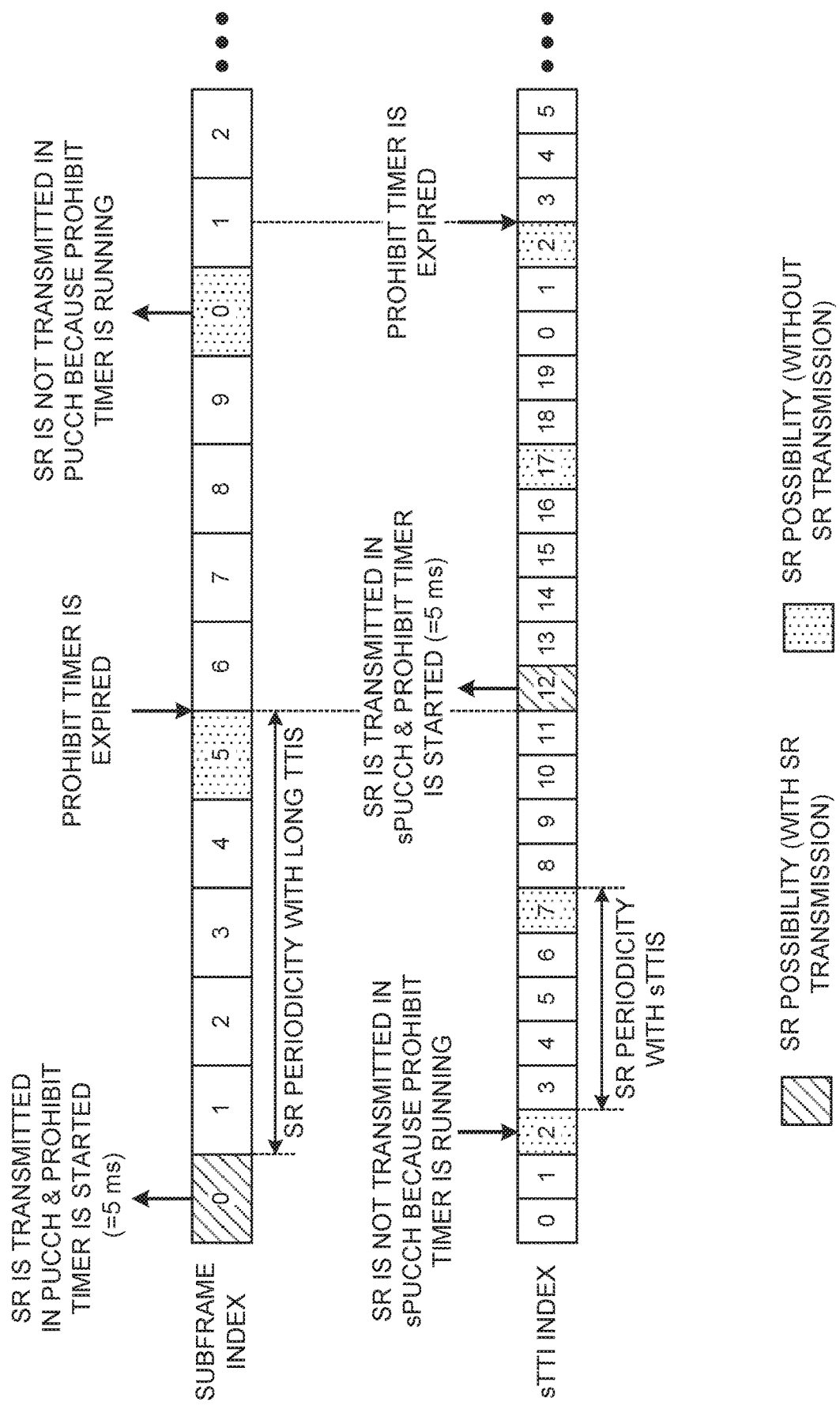
FIG. 6 is a diagram to show an example of SR transmission according to embodiment 1.3.1.

FIG. 6 is a diagram to show an example of SR transmission according to embodiment 1.3.1. In this example, as the SR configurations for long TTIs (1-ms TTIs), a configuration index of 0 is configured in the UE (referring to FIG. 1, the SR starting position is subframe #0, and the SR periodicity is five subframes). Furthermore, as the SR configuration for short TTIs, a configuration index of 2 is configured in the UE (referring to FIG. 4, the SR starting position is sTTI #2 (the first slot in subframe #1) and the SR periodicity is five sTTIs).

Also, for a prohibit timer for common use between long TTIs and short TTIs, a prohibit timer expiration time of 5 ms is configured in the UE. In the UE, an SR is triggered at the time of first subframe #0.

In this case, the UE transmits the SR using the PUCCH in first subframe #0, and starts the prohibit timer. Although subframe #5, sTTI #2 and sTTI #7 are SR possibilities, since the prohibit timer is still running, even if the UE has data to transmit, the UE does not transmit SRs at these timings.

The prohibit timer expires at the end of subframe #5, so the UE transmits an SR in sTTI #12, using the sPUCCH, and starts the prohibit timer. Although the next subframe #0, sTTI #17 and subsequent sTTI #2 are SR possibilities, the prohibit timer is running, so the UE does not transmit SRs at these timings.

As described above, according to embodiment 1.3.1, the UE can transmit an SR using one of the PUCCH and the sPUCCH that becomes available at an earlier timing.

Embodiment 1.3.2

In embodiment 1.3.2, independent SR procedures are used for long TTIs and for short TTIs, separately.

The SR periodicity, the offset, and the expiration time of the prohibit timer may be configured separately between long TTIs and short TTIs. Each parameter may be defined in the same unit as in embodiment 1.3.1.

The first SR counter and the first prohibit timer may be applied to the SRs in long TTIs, and a second SR counter and a second prohibit timer may be applied to the SRs in short TTIs.

A new parameter relating to the SR priority control for short TTIs (also referred to as, for example, "sTTI priority control parameter," "logicalChannelSR-sTTI-r4/15" and so on) may be introduced. While this parameter is enabled, if low-latency (LL) traffic is present in a related logical channel (or a logical channel group (LCG)), an SR to request resources for this LL traffic may be transmitted in a short TTI (sTTI), and this SR may be kept from being transmitted in a long TTI.

If there is no LL traffic in the related logical channel (or LCG) and/or this parameter is disabled, the SR is not transmitted in an sTTI (that is. SR transmission falls back to a long TTI (PUCCH)). For example, an SR to request resources for normal traffic is transmitted in a long TTI.

Figure 7:
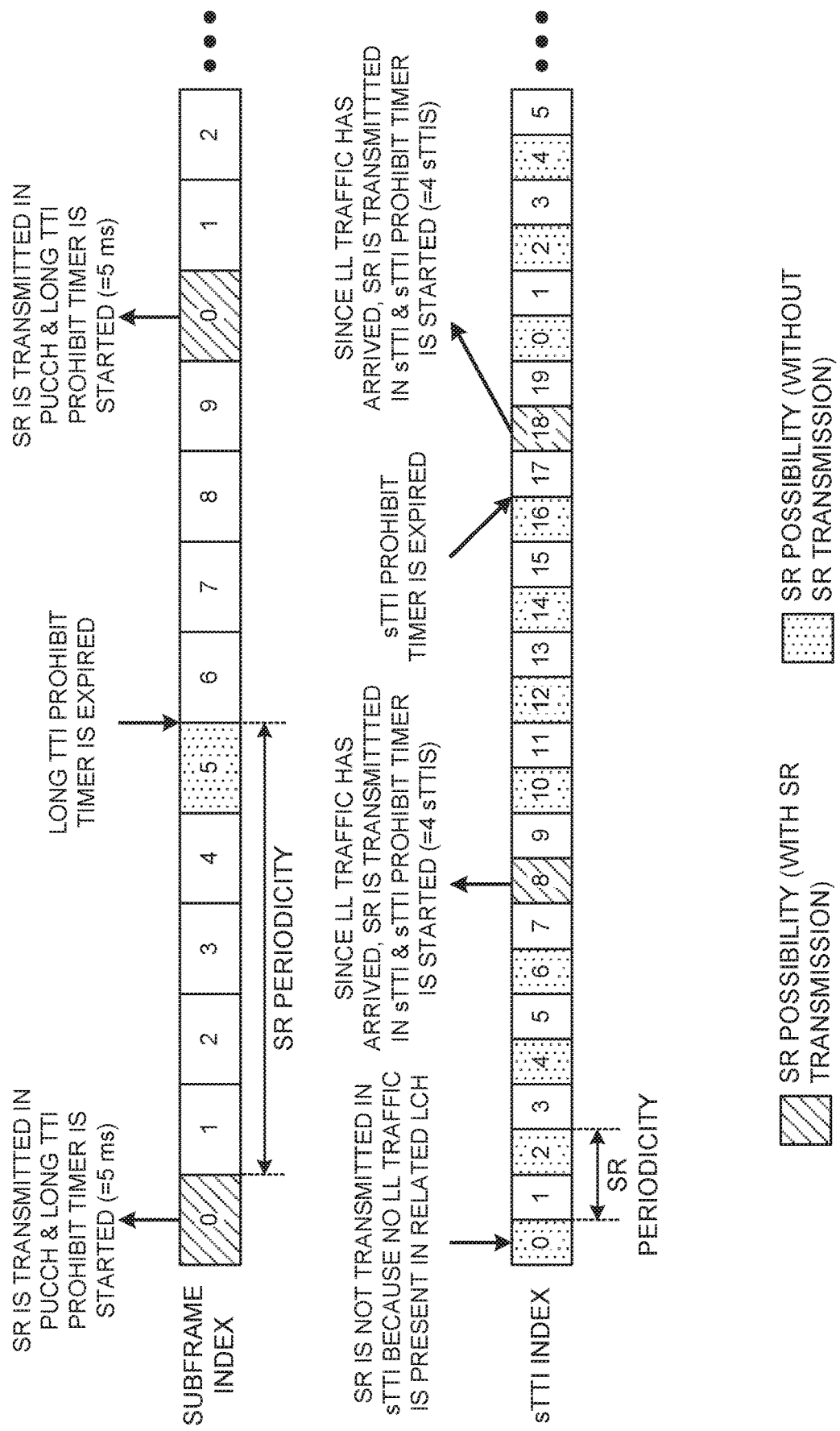
FIG. 7 is a diagram to show an example of SR transmission according to embodiment 1.3.2.

FIG. 7 is a diagram to show an example of SR transmission according to embodiment 1.3.2. In this example, as the SR configuration for long TTIs (1-ms TTIs), a configuration index of 0 (referring to FIG. 1, the SR starting position is subframe #0, and the SR periodicity is five subframes) and a prohibit timer expiration time of 5 ms are configured in the UE. Furthermore, as the SR configuration for short TTIs, a configuration index of 155 (referring to FIG. 4, the SR starting position is sTTI #0 (first slot in subframe #0), and the SR periodicity is two sTTIs), and a prohibit timer expiration time of eight sTTIs are configured in the UE.

In addition, the above sTTI priority control parameter is configured to "enabled." Assume that the UE has no LL traffic (an STTI SR is not triggered) for a related LCH in first subframe #0.

In this case, the UE does not transmit an SR by using the sPUCCH in sTTI #0, but transmits an SR using the PUCCH in subframe #0, and start the long TTI prohibit timer.

Since LL traffic does not occur until sTTI index #6, the UE does not transmit the SR using the sPUCCH. After that. LL traffic arrives, and the UE transmits an SR using the sPUCCH in sTTI #8, starting the short TTI prohibit timer. Thus, even if the long TTI timer has not expired, the UE can transmit SRs using the sPUCCH.

As described above, according to embodiment 1.3.2, the UE controls SR procedures separately between the PUCCH and the sPUCCH, so that it is possible to reduce the latency in SR transmission. In addition, it is possible to transmit SRs related to predetermined LL traffic quickly, in sTTIs.

Embodiment 1.3.3

In embodiment 1.3.3, one single SR procedure is switched between long TTIs and short TTIs.

The configurations of the SR periodicity and the offset are the same as in embodiment 1.3.1, and therefore the description will be omitted.

One SR counter and one prohibit timer may be applied to both SRs in long TTIs and SRs in short TTIs. Note that, even if there is only one prohibit timer, the expiration time of the prohibit timer may be configured differently between long TTIs and short TTIs. If an SR is transmitted in the PUCCH and the prohibit timer is started, the expiration time configured for long TTIs may be used, or, if an SR is transmitted in the PUCCH and prohibit timer is started, the expiration time configured for short TTIs may be used.

The granularity of the prohibit timer's expiration time may be defined in units of subframes, or may be defined in sTTI units. Note that the granularity of the prohibit timer's expiration time may be defined in units of subframes when an SR transmitted in the PUCCH and the prohibit timer is started, or may be defined in TTI units when an SR transmitted in the sPUCCH and the prohibit timer is started.

In embodiment 1.3.3, the sTTI priority control parameter (LogicalChannelSR-sTT-r14/15), which has been described in embodiment 1.3.2, is introduced. The process based on this parameter is the same as in embodiment 1.3.2, and therefore the description will be omitted.

Although embodiment 1.3.3 is very similar to embodiment 1.3.1, the differences will be explained below. In embodiment 1.3.1, the SR is transmitted at the earliest timing where an SR can be transmitted from the present time regardless of the type of traffic and the duration of TTIs. Meanwhile, embodiment 1.3.3 differs from embodiment 1.3.1 in that, by enabling the above new parameter, SR transmission sTTIs is prioritized when LL traffic is present.

Figure 8:
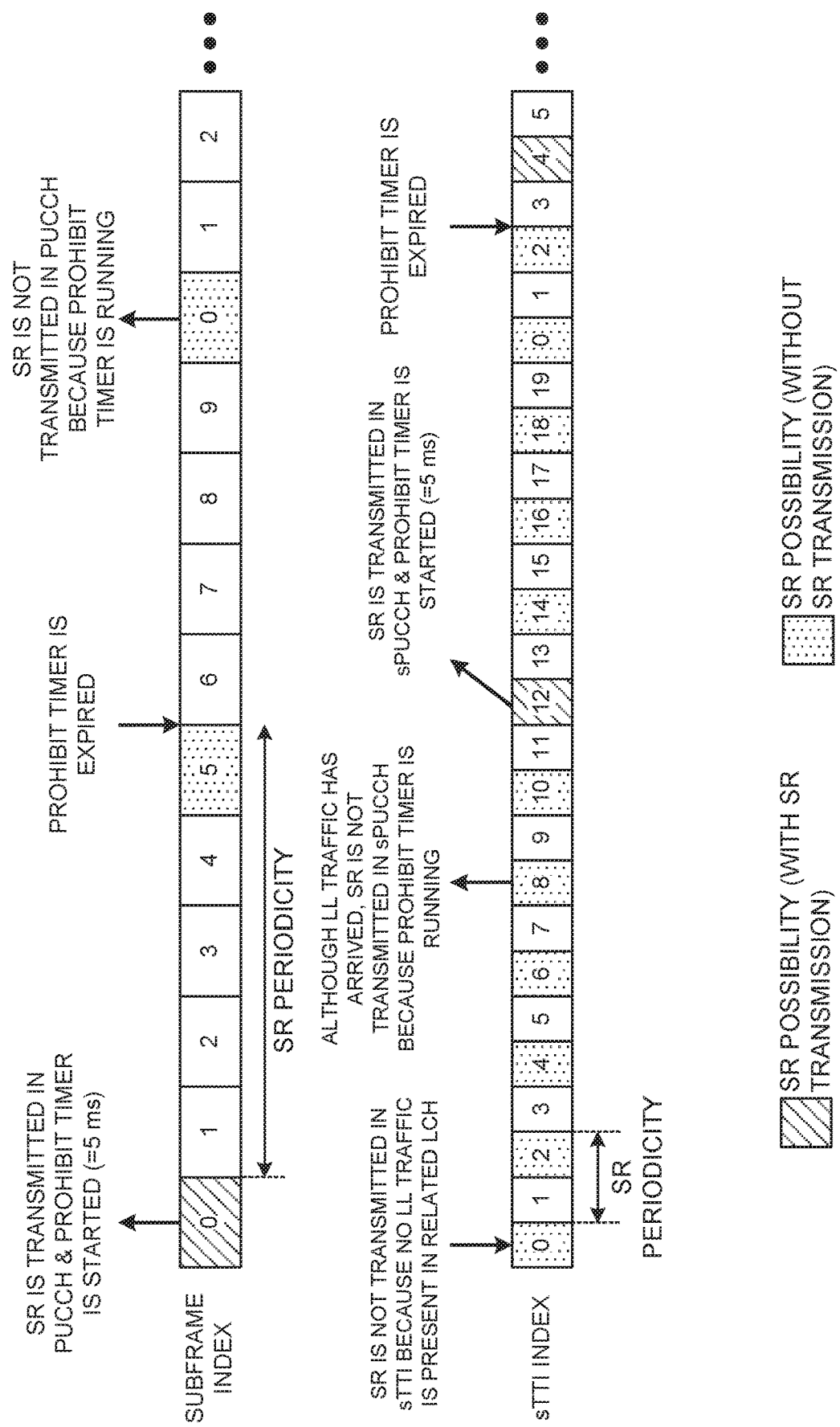
FIG. 8 is a diagram to show an example of SR transmission according to embodiment 1.3.3.

FIG. 8 is a diagram to show an example of SR transmission according to embodiment 1.3.3. In this example, as the SR configuration for long TTIs (1-ms TTIs), a configuration index of 0 is configured in the UE (referring to FIG. 1, the SR starting position is subframe #0, and the SR periodicity is five subframes). Furthermore, as the SR configuration for short TTIs, a configuration index of 155 is configured in the UE (referring to FIG. 4, the SR starting position is sTTI #0 (the first slot in subframe #0), and the SR periodicity is two sTTIs).

Furthermore, in the UE, a prohibit timer expiration time of 5 ms is configured for both long TTIs and short TTIs. In addition, the above sTTI priority control parameter is configured to "enabled." In first subframe #0, the UE has no LL traffic for a related LCH.

In this case, the UE does not transmit an SR using the sPUCCH in sTTI #0, transmits an SR using the PUCCH in subframe #0, and starts the prohibit timer.

Upon arrival of LL traffic following sTTI index #6, the prohibit timer is still running, so the UE is unable to transmit SRs using the sPUCCH in sTTIs #8 and #10. When the prohibit timer expires at the end of subframe #5, the UE transmits an SR using the sPUCCH in sTTI #12, which is the earliest SR possibility in the sTTIs, and starts the prohibit timer.

Although next subframe #0 is an SR possibility, the prohibit timer is still running, so the UE cannot transmit an SR at this timing. Depending on traffic, it is possible to transmit SRs using subframes or sTTIs (for example, sTTI #4) after the prohibit timer expires.

Figure 9:
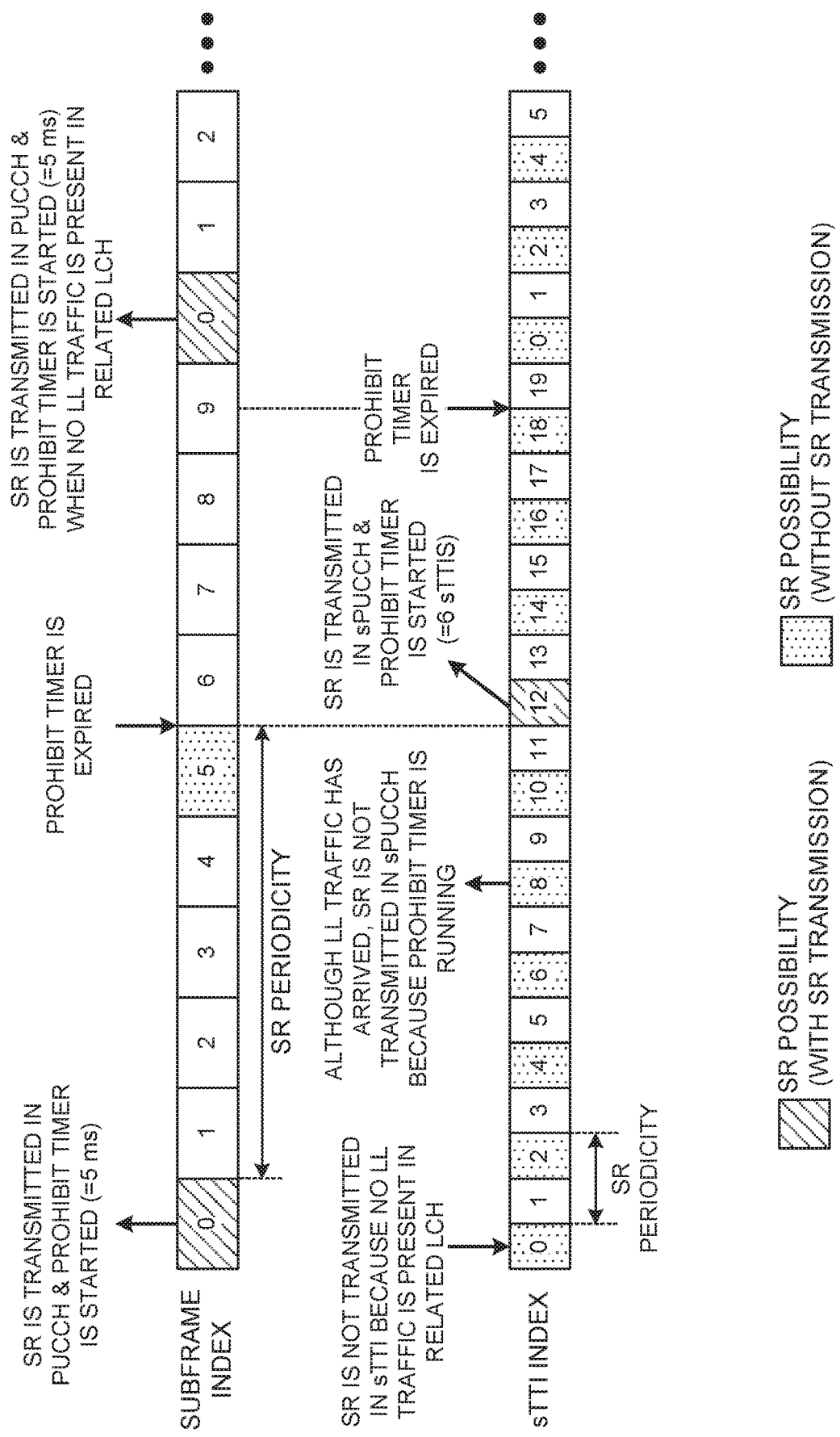
FIG. 9 is a diagram to show another example of SR transmission according to embodiment 1.3.3.

FIG. 9 is a diagram to show another example of SR transmission according to embodiment 1.3.3. In this example, as the SR configuration for long TTIs (1-ms TTIs), a configuration index of 0 (referring to FIG. 1, the SR starting position is subframe #0, and the SR periodicity is five subframes) and a prohibit timer expiration time of 5 ms are configured in the UE. Furthermore, as the SR configuration for short TTIs, a configuration index of 155 (referring to FIG. 4, the SR starting position is sTTI #0 (the first slot in subframe #0) and the SR periodicity is two sTTIs) and a prohibit timer expiration time of six sTTIs are configured in the UE.

Furthermore, the above sTTI priority control parameter is configured to "enabled." In first subframe #0, the UE has no LL traffic for a related LCH.

In this case, the UE has no LL traffic for a related LCH in first subframe #0, so the UE does not transmit an SR using the sPUCCH in sTTI #0, and transmits an SR using the PUCCH in subframe #0, and starts the prohibit timer (=5 ms).

Upon arrival of LL traffic following sTTI index #6, the prohibit timer is still running, so the UE cannot transmit SRs using the sPUCCH in sTTIs #8 and #10. When the prohibit timer expires at the end of subframe #5, the UE transmits an SR using the sPUCCH in sTTI #12, which is the earliest SR possibility in the sTTIs, and starts the prohibit timer (=six sTTIs).

The prohibit timer expires at the end of sTTI #18. In following subframe #0, if the UE has none of the predetermined LL traffic but has different traffic (UL data), the UE may transmit an SR using the PUCCH, and start the prohibit timer (=5 ms).

As described above, according to embodiment 1.3.3, the UE can transmit SRs that pertain to predetermined LL traffic in STTIs, preferentially and quickly, and transmit SRs pertaining to other traffic in long TTIs.

Alternative Example of Embodiment 1.3.3

In embodiment 1.3.3, for example, a long TTI priority control parameter (which may be referred to as "logicalChannelSR-long_TTI-r14/15") may be introduced instead of the sTTI priority control parameter (logicalChannelSR-sTTI-r14/15). If, while this parameter is enabled, normal traffic is present in a related logical channel (or LCG), an SR to request resources for normal traffic may be transmitted in a long TTI.

If arbitrary LL traffic is present and/or this parameter is disabled. SRs are always transmitted in sTTIs.

Figure 10:
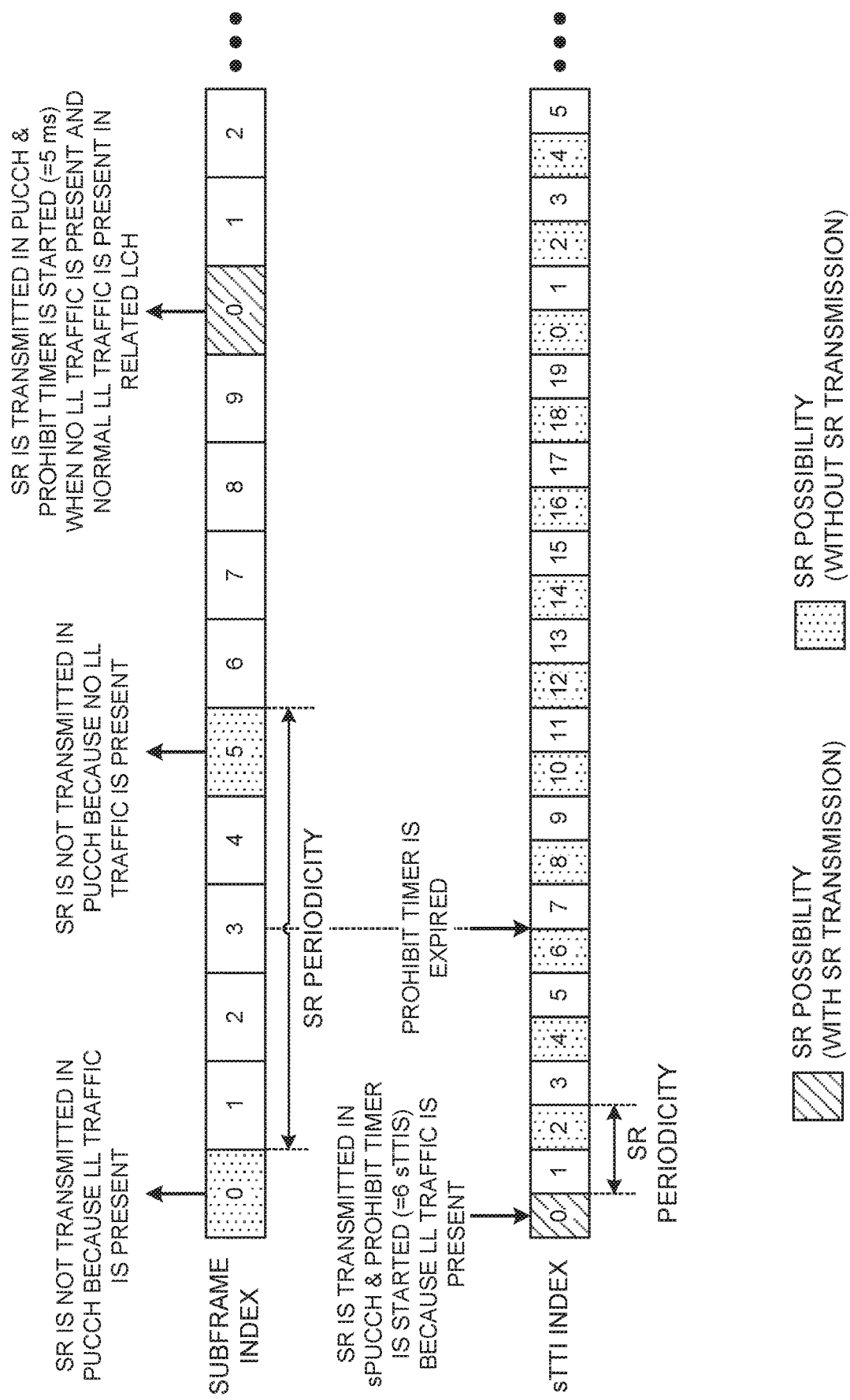
FIG. 10 is a diagram to show an example of SR transmission according to a variation of embodiment 1.3.3.

FIG. 10 is a diagram showing an example of SR transmission according to an alternative example of embodiment 1.3.3. In this example, the SR configuration for the long TTI (1-ms TTIs) and the SR configuration for the short TTI are both the same as in FIG. 9. In addition, the long TTI priority control parameter is configured to "enabled." In first subframe #0, the UE has LL traffic (an sTTI SR is triggered).

In this case, the UE has LL traffic in first subframe #0, so the UE does not transmit an SR using the PUCCH in subframe #0, but transmits an SR using the sPUCCH in sTTI #0, and starts the prohibit timer (=six sTTIs).

Although the prohibit timer expires at the end of sTTI #6, since there is no normal traffic in a related LCH yet, the UE does not transmit an SR using the PUCCH. In following subframe #0, if the UE does not have LL traffic but has normal traffic in the related LCH, the UE may transmit an SR using the PUCCH, and start the prohibit timer (=5 ms).

As described above, according to an alternative example of embodiment 1.3.3, when LL traffic arrives, the UE can preferentially transmit an SR that pertains to this LL traffic in an sTTI, and transmit an SR that pertains to predetermined normal traffic in a long TTI.

[Signaling of SR Configuration According to First Embodiment]

According to the first embodiment, the SR configuration for long TTIs and the SR configuration for short TTIs may be reported separately through higher layer signaling (by using separate configuration indices), or a single SR configuration for long TTIs and short TTIs may be reported by higher layer signaling.

For example, if one configuration index is reported, the UE may judge the SR periodicity, the offset and so on with reference to the first associations for long TTIs (see, for example, FIG. 1), and with reference to second associations for short TTIs (see, for example, FIG. 3). In this case, the UE may interpret the same configuration in accordance with the granularity of each TTI. For example, the UE may judge the SR configuration assuming that a long TTI has a time duration of 1 ms and that a short TTI has a time duration of two or seven OFDM symbols.

Figure 11A:
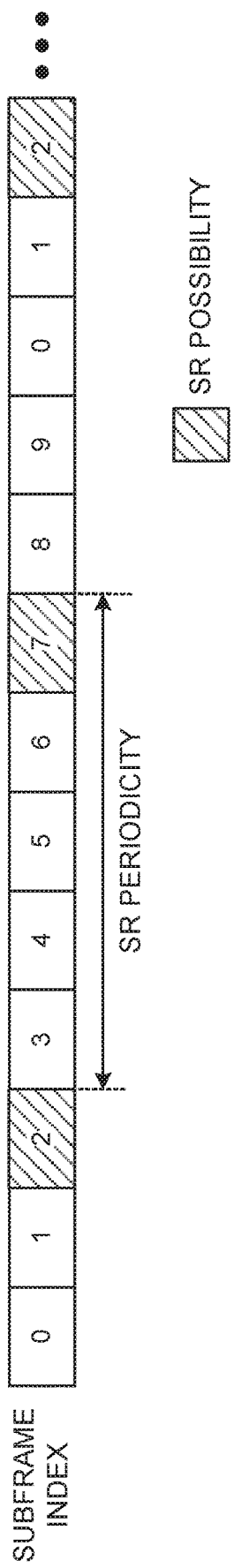
FIGS. 11A and 11B are diagrams, showing examples of how SRs are transmitted in the event a single SR configuration is reported for long TTIs and short TTIs.
Figure 11B:
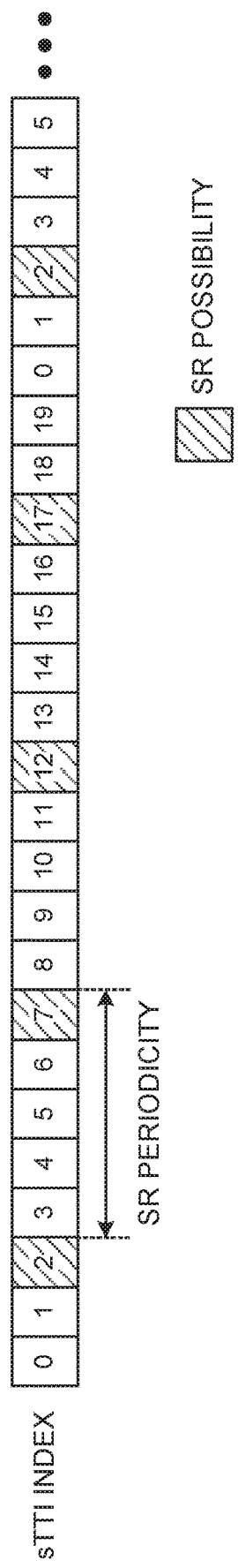

FIGS. 11A and 11B are diagrams, each showing an example of SR transmission in the event a single SR configuration is reported for long TTIs and short TTIs. In this example, an SR configuration index of 2 is reported.

For example, when determining the SR configuration for transmission using the PUCCH in a long TTI, the UE may acquire the SR periodicity, the SR offset and so on from the configuration index, with reference to the associations for long TTIs, such as those shown in FIG. 1 (FIG. 1A). On the other hand, when determining the SR configuration for transmission using a short TTI's sPUCCH, the UE may acquire the SR periodicity, the SR offset and so on from the configuration index, with reference to the associations for short TTIs, such as those shown in FIG. 4 (FIG. 11B).

According to the first aspect described above, even when long TTIs and short TTIs are used in one carrier (CC), it is possible to transmit SRs at adequate timings using the PUCCH and/or the sPUCCH based on the configuration of the base station.

Second Embodiment

According to a second embodiment of the present invention, in which channel UCI is transmitted when a UE supports simultaneous transmission of a PUCCH and an sPUCCH and higher layer signaling (for example, RRC signaling) to enable this simultaneous transmission is reported, will be explained.

In the above case, the UE can transmit UCI in accordance with one of following (1) to (4):
(1) The UE may transmit one or a plurality of HARQ-ACKs in response to the PDSCH using the PUCCH, and transmit an SR using the sPUCCH;
(2) The UE may transmit one or a plurality of HARQ-ACKs in response to the sPDSCH using the sPUCCH, and transmit an SR using the PUCCH;
(3) The UE may transmit one or a plurality of P-CSIs using the PUCCH, and transmit an SR using the sPUCCH; and
(4) The UE may transmit one or a plurality of P-CSIs using the sPUCCH, and transmit an SR using PUCCH.

According to the second embodiment described above, when the UE transmits a PUCCH and an sPUCCH at the same time, the UE can transmit UCI including an SR by using an appropriate channel. In particular, in the case of (1), the accuracy of HARQ-ACK detection can be improved, and, regarding SRs, it is possible to shorten the latency and achieve reduced UL latency. In particular, in the case of (2), it is possible to re-use existing terminal operations with respect to SRs, and, regarding HARQ-ACKs, it is possible to shorten the latency and achieve reduced UL latency. In particular, in the case of (3), it is possible to allocate a large-capacity PUCCH to a P-CSI having a relatively large payload, and, regarding SRs, it is possible to shorten the latency and achieve reduced UL latency. In particular, in the case of (4), regarding CSI, which has a significant impact on DL throughput, it is possible to achieve accelerated feedback by way of latency reduction, and, regarding SRs, it is possible to re-use existing terminal operations.

Third Embodiment

With a third embodiment of the present invention, which channel is used to transmit UCI when a UE does not support simultaneous transmission of a PUCCH and an sPUCCH or higher layer signaling (for example, RRC signaling) to disable this simultaneous transmission is reported, will be explained.

When the UE cannot transmit a PUCCH and an sPUCCH simultaneously, one or a plurality of HARQ-ACKs in response to the PDSCH (HARQ-ACKs that are originally scheduled to be transmitted in the PUCCH) and an SR that is originally scheduled to be transmitted in the sPUCCH may be (a1) transmitted in the sPUCCH, (a2) transmitted in the PUCCH or (a3) transmitted in either the sPUCCH or the PUCCH, based on predetermined conditions.

In the case of (a1), the SR is one or zero bit. When the SR is zero bit, the same method (described later) as in existing LTE may be used when multiplexing a one-bit or two-bit HARQ-ACK from the PCell (primary cell) with an SR.

In the case of (a2), the SR is one bit, and placed in a predetermined position with respect to (for example, before or after) an HARQ-ACK or a P-CSI. In the case of (a3), if the HARQ-ACK is one or two bits, the UE transmits the HARQ-ACK and the SR using the sPUCCH, or, otherwise, the UE may transmit the HARQ-ACK and the SR using the PUCCH.

If the UE cannot transmit the PUCCH and sPUCCH simultaneously, one or a plurality of HARQ-ACKs in response to the sPDSCH (HARQ-ACKs that are originally scheduled to be transmitted in the ePUCCH) and an SR that is originally scheduled to be transmitted in the PUCCH, may be (b1) transmitted in the sPUCCH, or (b2) transmitted in the PUCCH.

In the case of (b1), the SR is one bit, and placed in a predetermined position with respect to (for example, before or after) an HARQ-ACK or a P-CSI. In the case of (b2), the SR is one or zero bit.

In cases such as (a1), (a2), (a3), (b1) and (b2) above, the UE may determine the resources based on the method of determining SR transmission resources in existing LTE. FIGS. 12A to 12D are diagrams, each showing an example of SR transmission resource in existing LTE. In existing LTE (for example, LTE Rel.13), resources for SRs are configured in the UE by higher layer signaling. Furthermore, the UE may determine the resources for HARQ-ACKs based on corresponding downlink data resources, DCI an so on.

As shown in FIG. 12A, in a subframe in which only an SR is transmitted, the UE may transmit the SR in an SR resource, by applying PUCCH format 1. As shown in FIG. 12B, in a subframe in which an HARQ-ACK and a negative SR (SR indicating that no UL resource is requested) are transmitted, for example, the UE may transmit the ACK/NACK in an HARQ-ACK resource, by applying PUCCH format 1a/1b.

As shown in FIG. 12C, in a subframe in which an HARQ-ACK and a positive SR (SR indicating that a UL resource is requested) are transmitted, for example, the UE may transmit the ACK/NACK in an SR resource, by applying PUCCH format 1a/1b. As shown in FIG. 12D, in a subframe in which an HARQ-ACK and a positive SR are transmitted, for example, the UE may transmit the ACK/NACK in an HARQ-ACK resource, by applying PUCCH format 3.

If the UE cannot transmit the PUCCH and sPUCCH simultaneously, the UE may transmit one or a plurality of P-CSIs that are originally scheduled to be transmitted in the PUCCH and an SR that is originally scheduled to be transmitted in the sPUCCH in accordance with one of the following (c1) and (c2):

(c1) The UE may drop all of the P-CSIs and transmit only the SR using the sPUCCH; and (c2) The UE may transmit both the P-CSIs and the SR in the PUCCH if PF4 or 5 is used in P-CSI transmission, or, otherwise, the UE drops all the P-CSIs and transmits the SR alone in the sPUCCH. Note that, if the SR is transmitted in the PUCCH, the SR is one bit and located before or after the P-CSIs. In the case where the P-CSIs and the SR are both transmitted in PF4 or 5, it may be possible to compare the coding rate, which is derived from the total payload of the P-CSIs and the SR and the amount of radio resources in PF 4 or 5, with a value configured by higher layer signaling (predetermined value), and drop one or a plurality of P-CSIs so as to make the above coding rate equal to or lower than the predetermined value.

If the UE cannot transmit the PUCCH and sPUCCH simultaneously, the UE can transmit one or a plurality of P-CSIs that were originally intended to be transmitted in the sPUCCH and the SR that is originally scheduled to be transmitted in the PUCCH in accordance with one of following (d1) to (d3):

(d1) The UE may drop all of the P-CSIs and may transmit only the SR in PUCCH;

(d2) The UE may drop all of the P-CSIs and transmit only the SR in sPUCCH; and (d3) The UE may transmit both the P-CSIs and the SR in the sPUCCH.

Note that the SR is one bit, and located before or after the P-CSIs. When both P-CSIs and the SR are transmitted in the sPUCCH, it may be possible to compare the coding rate, which is derived from the total payload of the P-CSIs and the SR and the amount of radio resources in the sPUCCH, with a value configured by higher layer signaling (predetermined value), and drop one or a plurality of P-CSIs so as to make the above coding rate equal to or lower than the predetermined value.

According to the third aspect described above, when the UE does not transmit a PUCCH and an sPUCCH at the same time, UCI to contain SRs can be transmitted using appropriate channels.

(Radio Communication System)

Now, the structure of the radio communication system according to one embodiment of the present invention will be described below. In this radio communication system, communication is performed using one of the radio communication methods according to the herein-contained embodiments of the present invention, or a combination of these.

Figure 13:
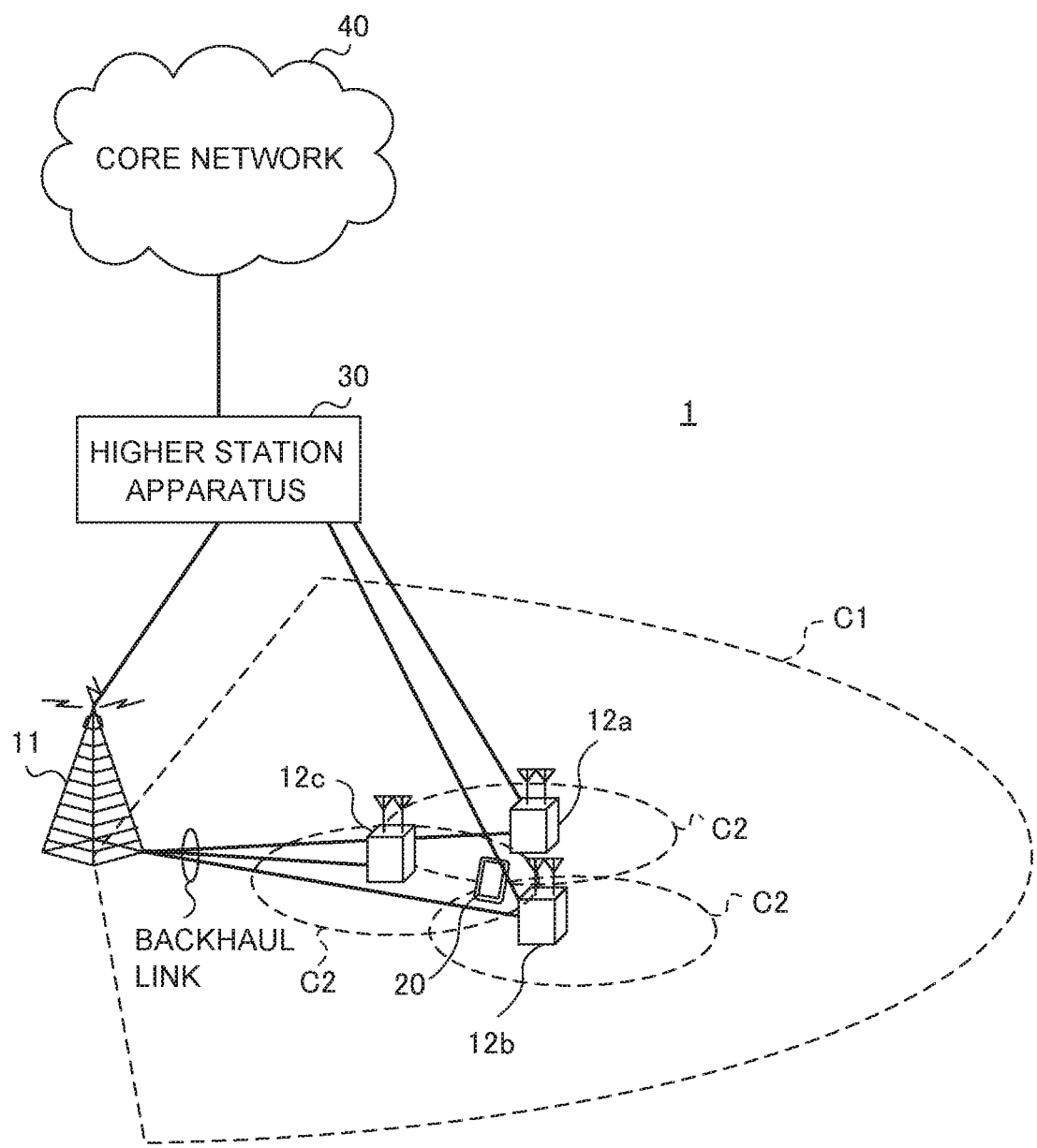
FIG. 13 is a diagram to show an example of a schematic structure of a radio communication system according to one embodiment of the present invention.

FIG. 13 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "MT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. The arrangements and numbers of cells and user terminals 20 are not limited to those illustrated in the drawing.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)." "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier.

SC-FDMA is a single-carrier communication scheme to mitigate interference between terminals by dividing the system bandwidth into bands formed with one or continuous resource blocks per terminal, and allowing a plurality of terminals to use mutually different bands. Note that, uplink and downlink radio access schemes are not limited to these combinations, and other radio access schemes may be used.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information SIBs (System Information Blocks) and so on are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), which includes PDSCH and/or PUSCH scheduling information, is communicated by the PDCCH.

Note that scheduling information may be reported in DCI. For example, DCI to schedule receipt of DL data may be referred to as a "DL assignment," and DCI to schedule UL data transmission may also be referred to as a "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data, higher layer control information and so on are communicated by the PUSCH. Also, downlink radio quality information (CQI: Channel Quality Indicator), delivery acknowledgement information and so on are communicated by the PUCCH. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs: Sounding Reference Signals), demodulation reference signals (DMRSs) and so on are communicated as uplink reference signals. Note that the DMRSs may be referred to as "user terminal-specific reference signals (UE-specific reference signals). Also, the reference signals to be communicated are by no means limited to these.

(Radio Base Station)

Figure 14:
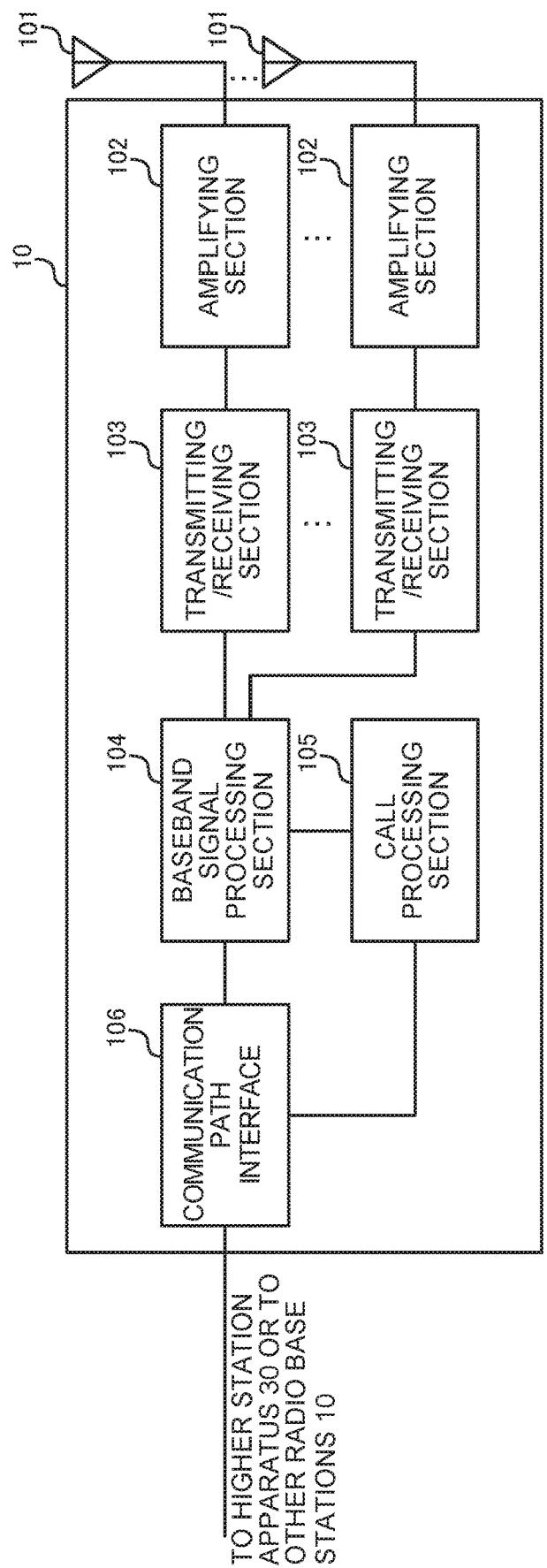
FIG. 14 is a diagram to show an example of an overall structure of a radio base station according to one embodiment of the present invention.

FIG. 14 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 may transmit and/or receive signals using a plurality of transmission time intervals of different durations. For example, the transmitting/receiving sections 103 can receive an SR using at least one of first TTI and a second TTI having a shorter TTI duration than the first TTI, in a given carrier.

Furthermore, the transmitting/receiving sections 103 may transmit a parameter related to an SR (for example, an SR configuration index), a parameter related to a prohibit timer (for example, information about the expiration time of the prohibit timer), information related to the associations between SR configuration indices, and SR periodicities and/or SR timing offsets, information as to in which one of a PUCCH and an sPUCCH an SR is transmitted when timings overlap, a short TTI (sTTI) priority control parameter and a long TTI priority control parameter. These parameters may be reported (configured) separately for long TTIs and for short TTIs, or a single parameter may be reported (configured).

Figure 15:
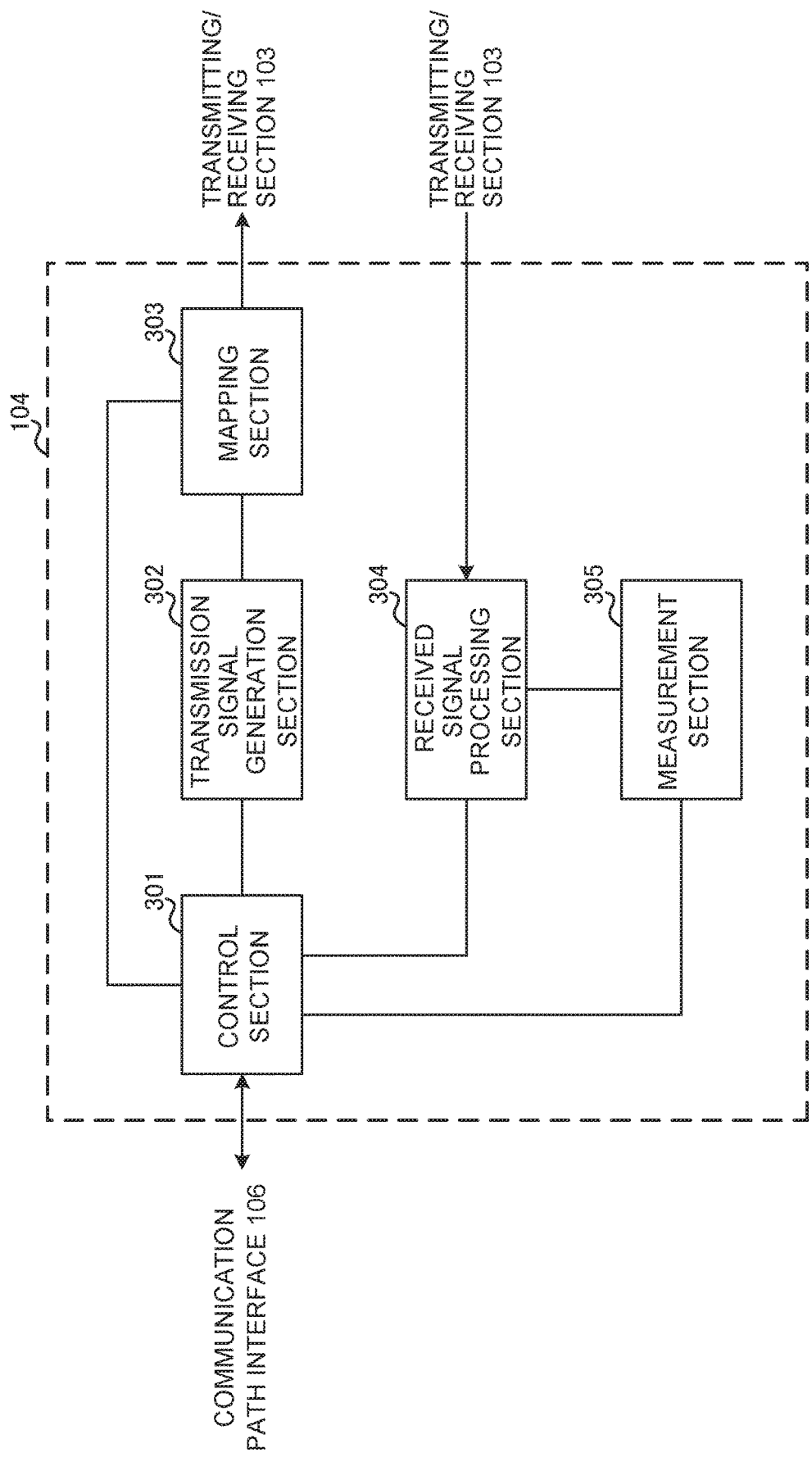
FIG. 15 is a diagram to show an example of a functional structure of a radio base station according to one embodiment of the present invention.

The parameter related to the prohibit timer for a predetermined TTIs may indicate how many times bigger the expiration time of the prohibit timer is than the minimum SR periodicity among the cells where a downlink control channel (PUCCH or sPUCCH) of the predetermined TTI is configured FIG. 15 is a diagram to show an example of a functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH), downlink control signals (for example, signals transmitted in the PDCCH and/or the EPDCCH, such as delivery acknowledgment information), and so on. Also, the control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

In addition, the control section 301 may control the scheduling of uplink data signals (for example, signals transmitted in the PUSCH), uplink control signals (for example, signals transmitted in the PUCCH and/or the PUSCH, such as acknowledgment information), random access preambles (for example, signal transmitted by the PRACH), uplink reference signals and so on.

The control section 301 controls the transmission and/or receipt of signals based on a first TTI (for example, a long TTI an nTTI, a slot, etc.) and a second TTI (for example, a short TTI, an sTTI, a minislot, etc.), which has a shorter TTI duration than the first TTI. The control section 301 may control information as to which of the first TTI and the second TTI is used to be transmitted to the user terminal 20.

The control section 301 may determine the resources (for example, time and/or frequency resources) to use to receive SRs, based on at least one of the first TTI and the second TTI. The control section 301 may, for example, perform control so that an SR is received using a PUCCH resource in the first TTI, or perform control so that an SR is received using an sPUCCH resource in the second TTI.

The control section 301 may configure an SR in a control channel in a given TTI, for a user terminal 20. For example, the control section 301 may configure SRs only in a control channel that is used in the first TTI (for example, the PUCCH), configure SRs only in a control channel that is used in the second TTI (for example, the sPUCCH), or configure SRs in both the control channel used in the first TTI and the control channel used in the second TTI.

The control section 301 may perform control so that high layer signaling for allowing the user terminal 20 to transmit an SR to request UL resources for predetermined traffic (for example, LL traffic) by using the control channel used in the second TTI, is transmitted to the user terminal 20.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, in compliance with DCI format. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), the signal strength (for example, RSSI (Received Signal Strength Indicator)), trans mission path information (for example, CSI), and so on. The measurement results may be output to the control section 301.

(User Terminal)

Figure 16:
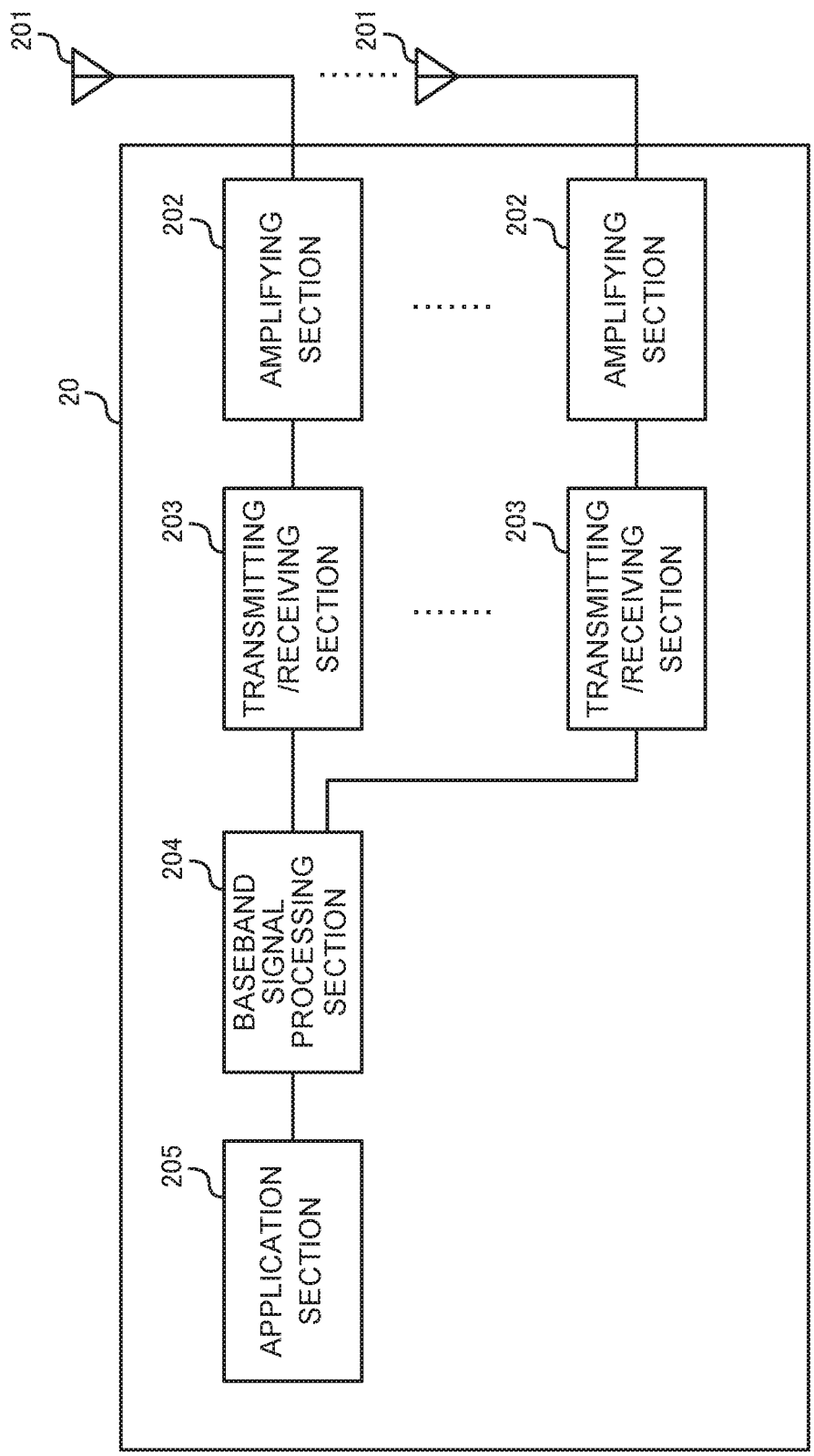
FIG. 16 is a diagram to show an example of an overall structure of a user terminal according to one embodiment of the present invention.

FIG. 16 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs receiving processes for the baseband signal that is input, including an FFT process, error correction decoding, a retransmission control receiving process and so on. Downlink user data is forwarded to the application section 205. The application section 205 performs processes related to higher layers above the physical layer and the MAC layer, and so on. In the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

The transmitting/receiving sections 203 may transmit and/or receive signals using a plurality of transmission time intervals of different durations. For example, the transmitting/receiving sections 203 can transmit an SR using at least one of a first TTI (for example, a long TTI) and a second TTI (for example, a short TTI) having a shorter TTI duration than the first TTI in a given carrier (a cell, a CC, etc.).

Furthermore, the transmitting/receiving section 203 may receive a parameter related to an SR (for example, an SR configuration index), a parameter related to a prohibit timer (for example, information about the expiration time of the prohibit timer), information related to the associations between SR configuration indices, and SR periodicities and/or SR timing offsets, information as to in which one of a PUCCH and an sPUCCH an SR is transmitted when these timings overlap, a short TTI (sTTI) priority control parameter and a long TTI priority control parameter. These parameters may be notified (configured) separately for long TTIs and for short TTIs, or a single parameter may be notified (configured).

Figure 17:
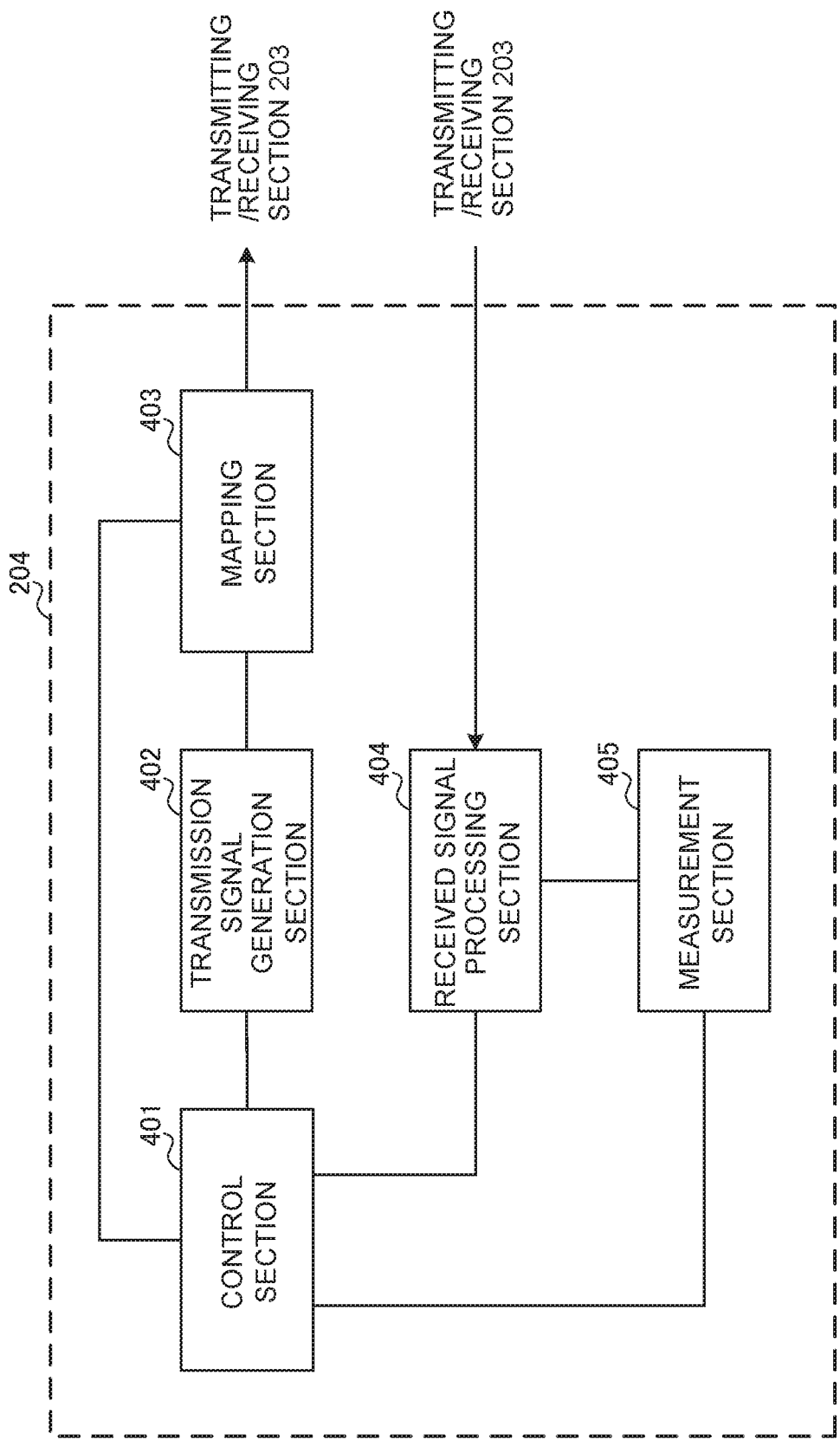
FIG. 17 is a diagram to show an example of a functional structure of a user terminal according to one embodiment of the present invention.

FIG. 17 is a diagram to show an example of a functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

The control section 401 controls the transmission and/or receipt of signals based on a first TTI (for example, a long TTI, an nTTI, a slot, etc.) and a second TTI (for example, a short TTI, an sTTI, a minislot, etc.) having a shorter TTI duration than the first TTI. The control section 401 may control information as to which of the first TTI and the second TTI is used to be transmitted to the user terminal 20.

The control section 401 may determine the resources (for example, time and/or frequency resources) to use to transmit SRs, based on at least one of the first TTI and the second TTI. The control section 401 may, for example, perform control so that an SR is transmitted using a PUCCH resource in the first TTI, or perform control so that an SR is transmitted using an sPUCCH resource in the second TTI.

The control section 401 may judge, based on a report from the radio base station 10, in which control channel SRs are configured. For example, based on a report from the radio base station 10, the control section 401 may assume that SRs are configured only in a control channel that is used in the first TTI (for example, the PUCCH), assume that SRs are configured only in a control channel that is used in the second TTI (for example, the sPUCCH), or assume that SRs are configured in both the control channel used in the first TTI and the control channel used in the second TTI.

If SRs are configured in both the control channel used in the first TTI (for example, the PUCCH) and the control channel used in the second TTI (for example, the sPUCCH), the control section 401 may apply one SR procedure to both TTIs in common, use two SR procedures independently, or switch and use one SR procedure.

Based on higher layer signaling received from the radio base station 10, the control section 401 may perform control so that an SR to request resources for given traffic (for example, LL traffic) is transmitted using the control channel used in the second TTI.

In addition, when various pieces of information reported from the radio base station 10 are acquired from the received signal processing section 404, the control section 401 may update the parameters used for control based on the information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generation apparatus that can be described based on general understanding of the technical field to which the present invention pertains.

For example, the transmission information generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information that is acquired through the receiving processes to the control section 401. The received signal processing section 404 outputs, for example, broadcast information, system information. RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, etc.), the signal strength (for example, RSSI), transmission path information (for example CSI), and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 18:
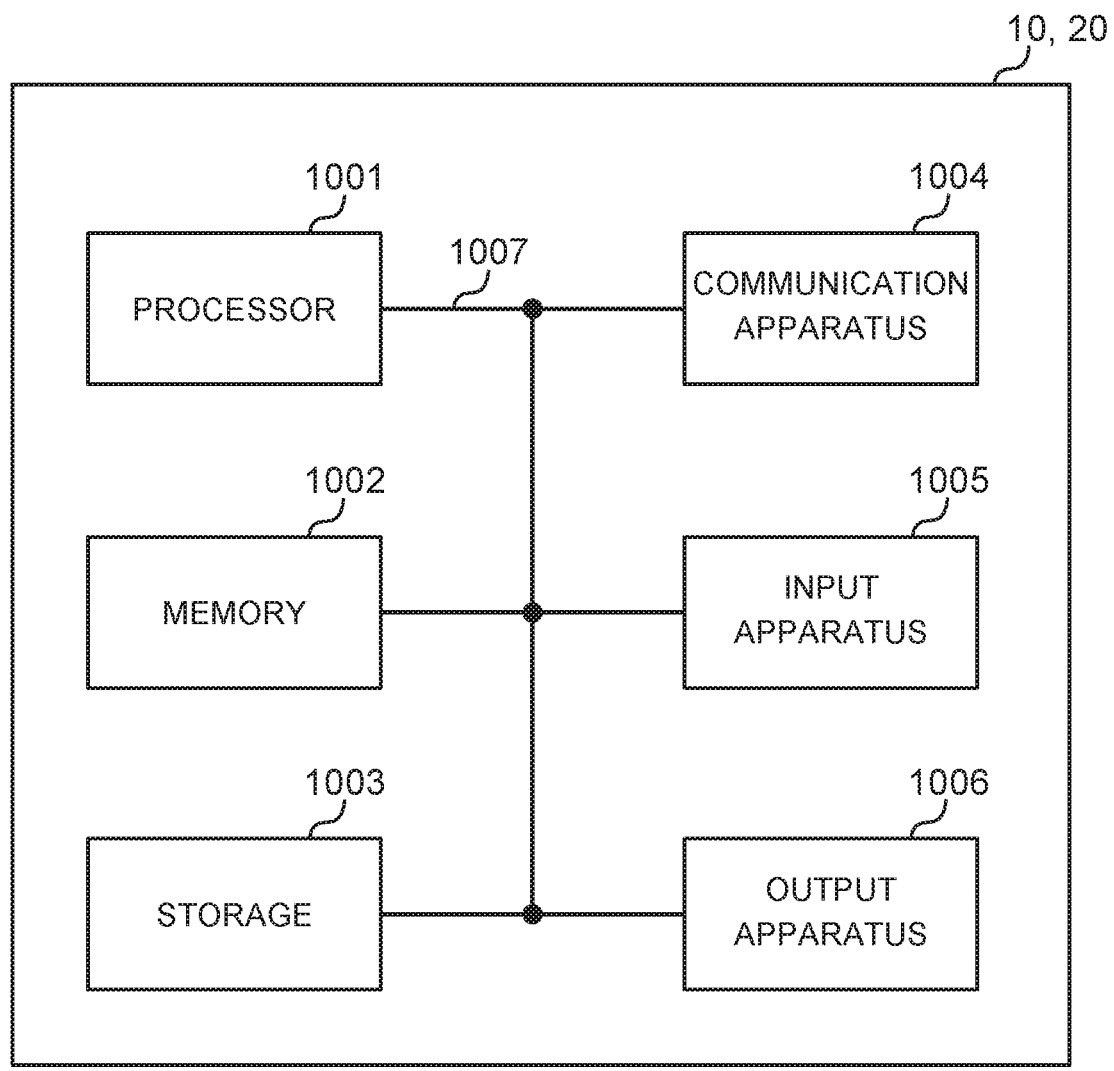
FIG. 18 is a diagram to show an example hardware structure of a radio base station and a user terminal according to one embodiment of the present invention.

For example, the radio base station, user terminals and so on according to embodiments of the present invention may function as a computer that executes the processes of the radio communication method of the present invention. FIG. 18 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling"). Also, "signals" may be "messages. A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe. Furthermore, a subframe may be comprised of one or more slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may consist of one or more symbols in the time domain. Also, a minislot may be referred to as a "subslot.

A radio frame, a subframe, a slot, a minislot and a symbol all represent the time unit in signal communication. A radio frame, a subframe, a slot, a minislot and a symbol may be each called by other applicable names. For example, one subframe may be referred to as a "transmission time interval" (TTI), or a plurality of consecutive subframes may be referred to as a "TTI," or one slot or minislot may be referred to as a "TTI. That is, a subframe and/or a TTI may be a subframe (1 ms) in existing LTE, may be a shorter period than 1 ms (for example, one to thirteen symbols), or may be a longer period of time than 1 ms. Note that the unit to represent the TTI may be referred to as a "slot," a "mini slot" and so on, instead of a "subframe.

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or more slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," "a partial TTI (or a "fractional TTI"), a "shortened subframe," a "short subframe," a "minislot," "a subslot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB: Physical RB)." a "subcarrier group (SCG: Sub-Carrier Group)," a "resource element group (REG)." an "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, minislots, symbols and so on described above are merely examples. For example, configurations pertaining to the number of subframes included in a radio frame, the number of slots included in a subframe, the number of minislots included in a slot, the number of symbols and RBs included in a slot or a minislot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L/L2 (Layer 1/Layer 2) control information" (L1/L2 control signals). "L1 control information" (L1 control signal) and so on. Also, RRC signaling may be referred to as "RRC messages." and can be, for example, an RRC connection setup message, RRC connection reconfiguration message, and so on. Also, MAC signaling may be reported using, for example MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB." "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal." "user equipment (UE)" and "terminal" may be used interchangeably. A base station may be referred to as a "fixed station." "NodeB," "eNodeB (eNB)," "access point," "transmission point," "receiving point," "femto cell." "small cell" and so on.

A mobile station may be referred to, by a person skilled in the art, as a "subscriber station," "mobile unit." "subscriber unit." "wireless unit." "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, terms such as "uplink" and "downlink" may be interpreted as "side. For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access). New-RAT (Radio Access Technology), NR(New Radio), NX (New radio access), FX (Future generation radio access). GSM (registered trademark) (Global System for Mobile communications). CDMA 2000. UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on." unless otherwise specified. In other words, the phrase "based on" means both "based only on" and "based at least on.

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-254325, filed on Dec. 27, 2016, including the specification, drawings and abstract, is incorporated herein by reference in its entirety.

The invention claimed is:

1. A terminal comprising:
a receiver that receives information on Scheduling Request (SR) configuration; and
a transmitter that, when a parameter related to the SR configuration is provided, transmits an SR corresponding to an associated logical channel by using a specific uplink control channel resource corresponding to the SR configuration,
wherein the transmitter applies mutually independent SR counters to respective SR configurations.

2. The terminal according to claim 1, wherein when the parameter related to the SR configuration is provided, the transmitter transmits the SR corresponding to the associated logical channel by prioritizing the specific uplink control channel resource over another uplink control channel resource.

3. The terminal according to claim 2, wherein each of multiple information on the SR configuration independently includes SR periodicity, offset and expiration time of a prohibit timer.

4. The terminal according to claim 1, wherein each of multiple information on the SR configuration independently includes SR periodicity, offset and expiration time of a prohibit timer.

5. A radio communication method for a terminal, comprising:
receiving information on Scheduling Request (SR) configuration; and
when a parameter related to the SR configuration is provided, transmitting an SR corresponding to an associated logical channel by using a specific uplink control channel resource corresponding to the SR configuration,
wherein mutually independent SR counters are applied to respective SR configurations.

6. A base station comprising:
a transmitter that transmits information on Scheduling Request (SR) configuration; and
a receiver that, when a parameter related to the SR configuration is provided, receives an SR corresponding to an associated logical channel by using a specific uplink control channel resource corresponding to the SR configuration,
wherein mutually independent SR counters are applied to respective SR configurations.

7. A system comprising a terminal and a base station, wherein:
the terminal comprises:
a first receiver that receives information on Scheduling Request (SR) configuration; and
a first transmitter that, when a parameter related to the SR configuration is provided, transmits an SR corresponding to an associated logical channel by using a specific uplink control channel resource corresponding to the SR configuration,
wherein the first transmitter applies mutually independent SR counters to respective SR configurations, and
the base station comprises:
a second transmitter that transmits the information; and
a second receiver that receives the SR,
wherein the mutually independent SR counters are applied to respective SR configurations.

* * * * *